(12) United States Patent
Dutta et al.

(10) Patent No.: US 11,866,267 B2
(45) Date of Patent: Jan. 9, 2024

(54) SYSTEM AND METHOD FOR MONITORING AN APRON FEEDER

(71) Applicant: Metso Outotec USA Inc., Brookfield, WI (US)

(72) Inventors: Sushanta Dutta, Seven Valleys, PA (US); Richard Hustwick, Perth (AU); Jesse Leach, Dallastown, PA (US)

(73) Assignee: Metso Outotec USA Inc., Brookfield, WI (US)

( * ) Notice: Subject to any disclaimer, the term of this patent is extended or adjusted under 35 U.S.C. 154(b) by 109 days.

(21) Appl. No.: 17/560,426

(22) Filed: Dec. 23, 2021

(65) Prior Publication Data

US 2023/0202766 A1 Jun. 29, 2023

(51) Int. Cl.
| | |
|---|---|
| *B65G 43/02* | (2006.01) |
| *B65G 43/06* | (2006.01) |
| *B65G 43/08* | (2006.01) |

(52) U.S. Cl.
CPC ...... *B65G 43/02* (2013.01); *B65G 2203/0275* (2013.01)

(58) Field of Classification Search
CPC ........ B65G 43/02; B65G 43/06; B65G 43/08; B65G 2203/0275
USPC ...................................................... 198/502.1
See application file for complete search history.

(56) References Cited

U.S. PATENT DOCUMENTS

| | | |
|---|---|---|
| 1,537,444 A | 5/1925 | Herzog |
| 3,934,712 A | 1/1976 | Jende |
| 6,662,930 B2 * | 12/2003 | Yester ............... G01G 11/00 177/52 |
| 10,793,371 B2 * | 10/2020 | Hou ................. G06Q 10/20 |
| 10,906,747 B2 * | 2/2021 | Aga ................. G01G 11/083 |

(Continued)

FOREIGN PATENT DOCUMENTS

| | | |
|---|---|---|
| CN | 102556627 A | 7/2012 |
| CN | 107305732 A | 10/2017 |

(Continued)

OTHER PUBLICATIONS

International Search Report and Written Opinion for International Application No. PCT/US2022/048138, dated May 8, 2023.

*Primary Examiner* — Douglas A Hess
(74) *Attorney, Agent, or Firm* — Andrus Intellectual Property Law, LLP

(57) ABSTRACT

A system for continuously monitoring an apron feeder in real-time, the apron feeder having a plurality of units. The system includes a plurality of sensor modules of different types, wherein each sensor module includes at least one sensor configured to measure an individual condition of a unit of the apron feeder, to generate sensor data representing the measured individual condition, and to transmit the generated sensor data. A base station is configured to collect the sensor data from the plurality of sensor modules, and to transmit outbound data, which is based on the collected sensor data. A processing unit receives the outbound data from the base station, analyses the outbound data for determining whether or not any of the unit of the apron feeder needs to be replaced or readjusted based on its individual condition, and generates a result of the determination for continuously indicating an overall state of the apron feeder.

17 Claims, 13 Drawing Sheets

(56) References Cited

U.S. PATENT DOCUMENTS

| | | | |
|---|---|---|---|
| 11,401,113 B2* | 8/2022 | Polak | G06T 7/11 |
| 11,414,276 B2* | 8/2022 | LeRoy | B65G 23/04 |
| 11,440,740 B2* | 9/2022 | Wang | B65G 47/76 |
| 11,608,230 B2* | 3/2023 | Baggio | B65G 39/02 |
| 2016/0362253 A1 | 12/2016 | Wheat et al. | |
| 2021/0130104 A1* | 5/2021 | Foxx-Gruensteidl | |
| 2021/0188566 A1 | 6/2021 | Koenig | |
| 2021/0370354 A1* | 12/2021 | Pearson | |
| 2022/0073283 A1 | 3/2022 | Wang et al. | |
| 2023/0009976 A1* | 1/2023 | Morris et al. | |

FOREIGN PATENT DOCUMENTS

| | | |
|---|---|---|
| CN | 212012708 U | 11/2020 |
| CN | 112978287 A | 6/2021 |
| EP | 0753472 A1 | 1/1997 |
| GB | 1364270 A | 8/1974 |
| WO | 2020177405 A1 | 9/2020 |

* cited by examiner

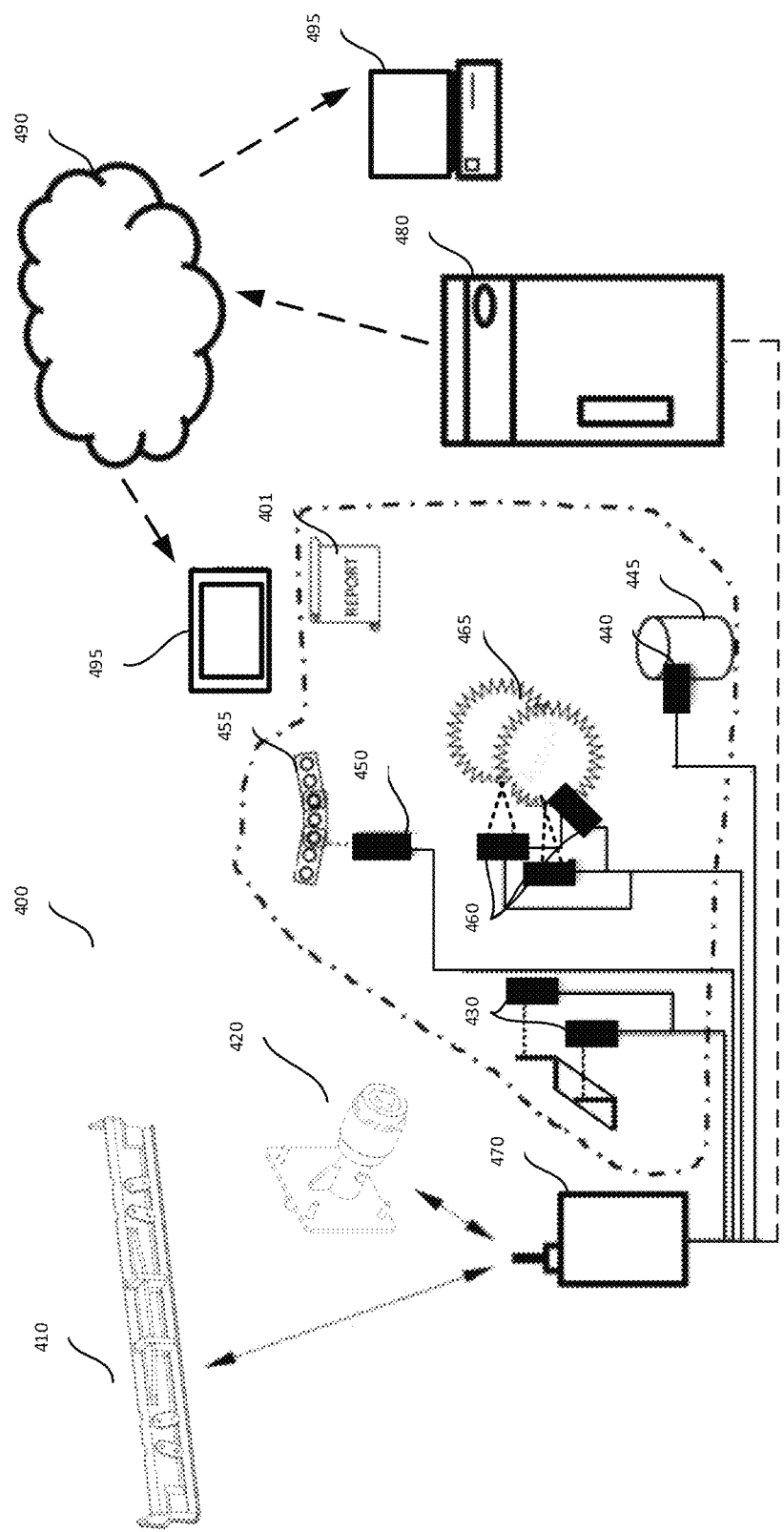

SYSTEM AND METHOD FOR MONITORING AN APRON FEEDER

FIELD

The present invention relates to an apron feeder intelligent monitoring system. In particular, the present invention relates to a system and method for continuously monitoring an apron feeder, the apron feeder having a plurality of units.

BACKGROUND

Apron feeders, also called apron conveyors, are typically used in the mining, cement, and other bulk materials industries for extracting bulk materials from bins, hoppers, silos, stockpiles, and the like. The apron feeders are then used to transfer the material to another location. Some specific uses of apron feeders known in the art are applications such as feeding and withdrawing materials from primary crushers, loading and unloading trucks and railcars, removing frozen materials from storage, feeding jaw crushers and belt conveyors, and high abrasion applications frequently found in reclaim circuits. Two examples of apron feeders known in the art are found in U.S. Pat. Nos. 3,934,712 and 1,537,444.

Apron feeders, particularly "tractor type" apron feeders, are often confused with other types of feeders such as belt feeders. Those skilled in the art will appreciate that apron feeders are distinguishable from belt feeders because belt feeders are not capable of being used in the heavy, bulk materials industry such as mining. Apron feeders are uniquely suited for feeding large, lumpy, abrasive, and heavy materials. Belt feeders are not suitable for use with such materials and are typically limited to light duty operations only. Thus, apron feeders are considered in the art to be distinguishable from belt feeders.

Apron feeders come in many different configurations. However, apron feeders generally share certain characteristics in common. Typically, apron feeders include a feeder frame upon which a head drive shaft is rotatably mounted. A tail wheel is located at an opposite end of the feeder frame from the head drive shaft. A plurality of carry rollers is located between the head drive shaft and tail wheel. Apron feeders further typically include a series of interconnected metal pans or flights that are reeved about the head drive shaft and tail wheel and supported by the carry rollers between the head drive shaft and tail wheel. Two or three strands of endless conveyor chain are often used to drive the pans and material carried thereon.

One known configuration for apron feeders locates the endless conveyor chain outboard of the flights such that the conveyor chain does not directly support the weight of the material on the flights. This arrangement is known as an outboard chain design. Another configuration known in the art for apron feeders was introduced in the early 1970's and is known as a "tractor type" apron feeder. A tractor type apron feeder utilizes tractor type undercarriage chain and rollers that are used on bulldozers and excavators. In the tractor type configuration, one or more conveyor chains are located under the flights. In recent years, tractor type apron feeders, also referred to as crawler apron feeders, have become the preferred design for use in the heavy materials industry.

TECHNICAL PROBLEM

As explained above, the apron feeder is often used for transporting large, lumpy, abrasive, and heavy materials, such that damages and wear on units of the apron feeder may occur. However, undetected damages and wear may lead to failure of the apron feeder, reduced apron feeder availability, and unplanned downtime. Undetected failures on process critical equipment can cause major delays and large losses to the operator of the apron feeder.

In order to avoid undetected damages and wear and unplanned downtime, a system and method are needed which monitor the overall state of the apron feeder in real-time.

SOLUTION

The present invention is defined by the appended independent claims. Further preferred embodiments are defined by the dependent claims.

According to an embodiment, a system for continuously monitoring an apron feeder having a plurality of units is provided which comprises a plurality of sensor modules of different types, wherein each sensor module refers to a specific type of units of the apron feeder and comprises at least one sensor, each sensor being configured to measure an individual condition of a unit of the apron feeder, to generate sensor data representing the measured condition, and to transmit the generated sensor data; a base station configured to collect the sensor data from the plurality of sensor modules, and to transmit outbound data, the outbound data being based on the collected sensor data; and a processing unit configured to receive the outbound data from the base station, to analyse the outbound data for determining whether or not any of the unit of the apron feeder needs to be replaced or readjusted based on its individual condition, and to generate a result of the determination for continuously indicating an overall state of the apron feeder, wherein the unit needs to be replaced or readjusted when its individual condition does not meet a predetermined threshold.

According to another embodiment, a method for continuously monitoring an apron feeder having a plurality of units is provided, the apron feeder being in relation to a plurality of sensor modules of different types, wherein each sensor module refers to a specific type of units of the apron feeder and comprises at least one sensor. The method comprises the steps of measuring, by each sensor, an individual condition of a unit of the apron feeder; generating, by the sensor, sensor data representing the measured individual condition; transmitting, by the sensor, the generated sensor; collecting, by a base station, the sensor data from the plurality of sensor modules; transmitting, by the base station, outbound data, the outbound data being based on the collected sensor data; receiving, by a processing unit, the outbound data from the base station; analysing, by the processing unit, the outbound data for determining whether or not any of the unit of the apron feeder needs to be replaced or readjusted based on its individual condition; and generating, by the processing unit, a result of the determination for continuously indicating an overall state of the apron feeder; wherein the unit needs to be replaced or readjusted when its individual condition does not meet a predetermined threshold.

BRIEF DESCRIPTION OF THE DRAWINGS

Embodiments of the present invention, which are presented for better understanding the inventive concepts and which are not to be seen as limiting the invention, will now be described with reference to the Figures in which:

FIG. 4 shows the apron feeder intelligent monitoring system associated to an apron feeder according to another embodiment of the invention.

DETAILED DESCRIPTION

The mechanism(s) described above and in more detail below solve technical problems that arise with regard to apron feeders. It is desired to provide a system that is capable of continuously monitoring and improving the overall state of the apron feeder in real-time, increase the availability of the apron feeder and reduce unplanned downtime. Furthermore, it is desired to assist in shutdown planning, i.e. in the long-term planning for the replacement and repair of wear or damaged apron feeder components. In addition, it is desired to provide additional guidance on maintaining the apron feeder and its components.

Figure 1A:
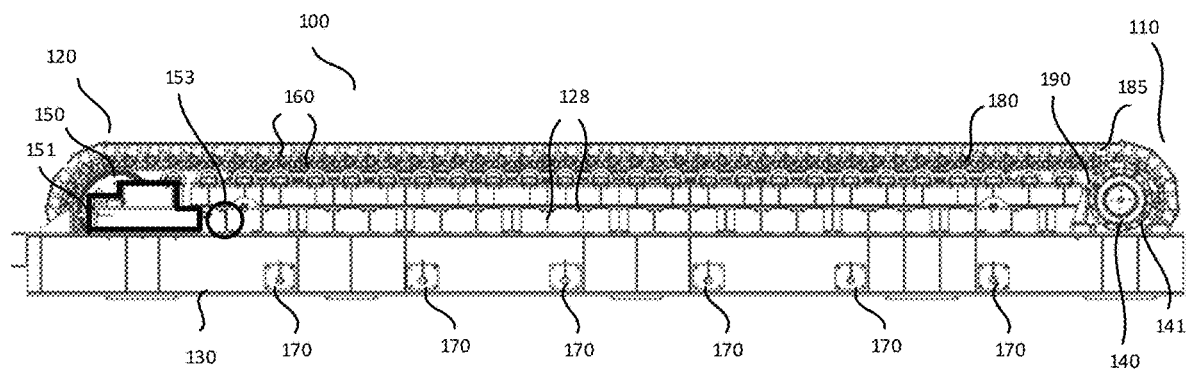
FIGS. 1A and 1B show a conventional apron feeder comprising a plurality of apron feeder units.

FIG. 1A shows a conventional apron feeder comprising a plurality of apron feeder units. The apron feeder 100 includes a feeder frame 130 defined by two substantially parallel support beams and at least one crossbeam. A head drive shaft 140 with sprocket engagement is mounted to the support beams by bearings, preferably double-row, self-aligning spherical roller bearings. The head drive shaft 140 is preferably located at the discharge end 110 of the apron feeder 100. A pair of drive sprockets 141 is mounted to the head drive shaft 140. In particular, the drive sprockets 141 may be bolted to a drive hub that is keyed to the head drive shaft 140. The drive sprockets 141 are preferably spaced uniformly apart on the head drive shaft 140. The head drive shaft 140 may be driven by a mechanical or hydraulic drive and motor (not shown). The drive motor is preferably a variable speed drive motor, which may be controlled by a speed sensor. The speed sensor may control the speed of the apron feeder 100.

Figure 1B:
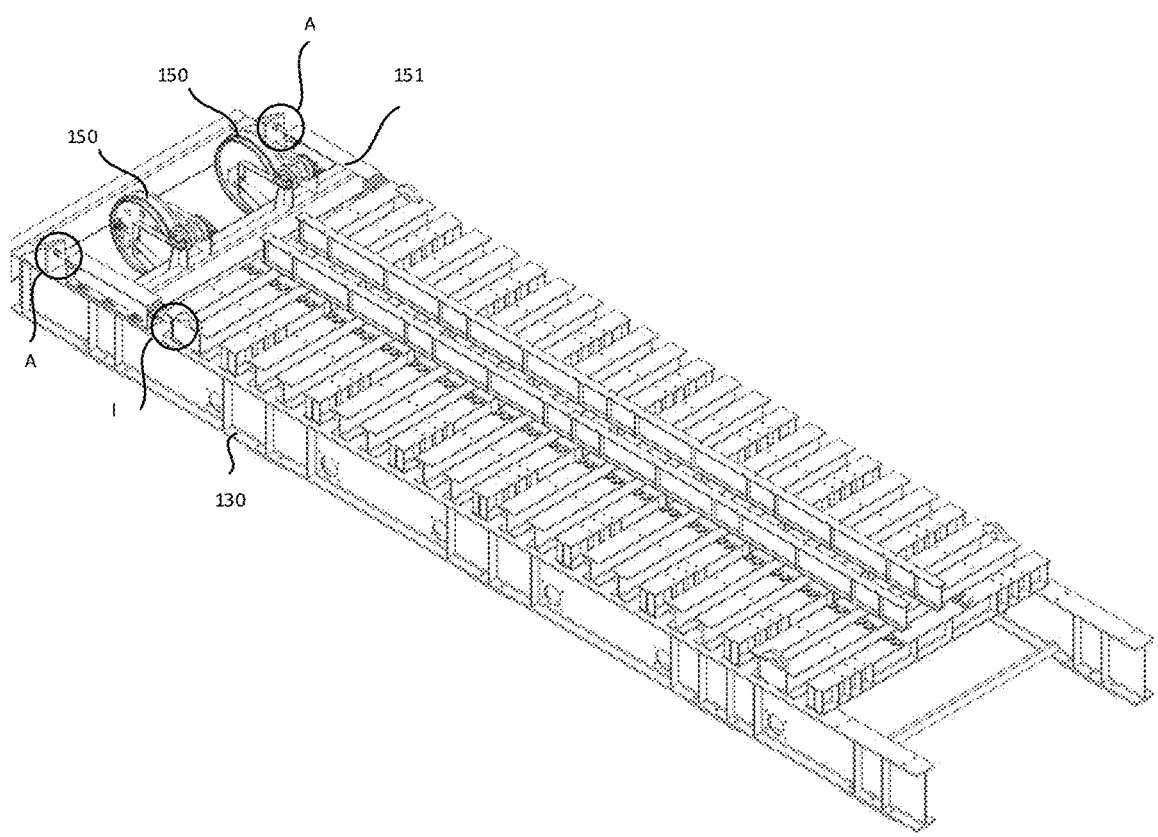

A tail wheel 150 with an adjustment frame 151 (the adjustment frame 151 being highlighted with a black box) is located at the extraction end 120 of the apron feeder 100. It is also possible to locate two or more tail wheels 150 at the extraction end 120. An example how to locate two tail wheels 150 is shown in FIG. 1B. FIG. 1B shows the feeder frame 130 and two tail wheels 150 which are located next to each other. The tail wheel(s) 150 is/are aligned with the drive sprockets 141. If two tail wheels 150 are provided as shown in FIG. 1B, two head drive shafts 140 with sprocket engagement may be mounted to the support beams.

Furthermore, the adjustment frame 151, two jacking points A, and a support beam I are highlighted in FIG. 1B.

A plurality of carry rollers 160 is located between the head drive shaft 140 and the tail wheel 150. The carry rollers 160 are arranged in two parallel rows between the drive sprockets 141 and the tail wheel 150. Preferably, the carry rollers may be mounted in pairs on respective carry roller support frames 128 which may be fixed to the support beams of the feeder frame 130. The rows of carry rollers 160 are aligned with the drive sprockets 141 and tail wheel 150. Additional "parallel" rows of drive sprockets 141, tail wheels 150, and carry rollers 160 may be used in the apron feeder 100. However, only one centrally located drive sprocket 141, tail wheel 150, and row of carry rollers 160 are necessary for the operation of the apron feeder 100.

The tail wheel 150 may be a "shaft-less" tail wheel. The tail wheel 150 may be rotatably mounted to a carry roller support frame 128 located at the extraction end 120 of the apron feeder 100. Alternatively, the tail wheel 150 may be commonly mounted on a shaft in a similar manner to the drive sprockets 141 and head drive shaft 140 discussed previously.

The carry rollers 160 may be closely spaced along the longitudinal length of the feeder frame 130 and a typical spacing for the carry rollers 160 may be about 30 to 50 cm depending on the intended application and duty of the apron feeder 100.

A plurality of return rollers 170 is rotatably mounted to the feeder frame 130 below the carry rollers 160. The return rollers 170 may be fewer in number than the carry rollers 160. In FIG. 1, three return rollers 170 are shown. However, this is not limiting. Fewer or more return rollers 170 may be placed within the feeder frame 130. The return rollers 170 may be bolted to the webs (support pillars) of the support beams of the feeder frame 130. The return rollers 170 are located below the carry roller support frames 128. The return rollers 170 may be aligned vertically below the rows of carry rollers 160. The return rollers 170 may be aligned with the edge of the pans, while the carry rollers 160 may be aligned with an endless chain 180.

The endless chain 180, such as a crawler chain or tractor type chain having hardened links, pins, and bushings, is reeved about the drive sprockets 141 and the tail wheel 150, respectively. If two tail wheels 150 are provided, as shown in FIG. 1B, two endless chains 180 may be provided, one endless chain 180 for each tail wheel 150 and head drive shafts 140. Teeth 190 of the drive sprockets 141 cooperate with the individual links of the endless chains 180 to drive the endless chain 180, as is known in the art. The carry rollers 160 and tail wheel 150 are each preferably formed with a central recess configured to receive the endless chain 180 and restrain the lateral movement of the endless chain 180 during operation of the apron feeder 100. Preferably, the endless chain 180 is a sealed type or a sealed and lubricated track type as are known in the art. The endless chain 180 traverses the apron feeder by being supported on a number of the carry rollers 160.

A plurality of pans or flights 185 is fixed to the endless chain 180 to define a carrying surface of the apron feeder 100. The individual pans 185 may be fixed to the endless chain 180 with heavy duty high strength bolts or the like. The pans 185 extend transversely across the apron feeder 100 with respect to the longitudinal axis of the apron feeder 100. The pans 185 are preferably made of a material resistant to high impact loading and abrasive operations such as austenitic manganese steel with a stiffened underside for additional strength. The return rollers 170 are attached to the webs of the support beams of the feeder frame 130 so as to support the sidewalls of the pans 185 during operation of the apron feeder 100.

The pans 185 and endless chain 180, in operation of the apron feeder 100, move in a path comprised of an upper rectilinear path and a lower rectilinear path connected by curvilinear paths. The pans 185 and endless chain 180 are supported by the carry rollers 160 while moving in the upper rectilinear path. The endless chain 180 is engaged by the drive sprockets 141 as the endless chain 180 moves about the curvilinear path at the discharge end 110 of the apron feeder 100. Similarly, the endless chain 180 is engaged by the tail wheel 150 as the endless chain 180 moves about the tail wheel 150 in the curvilinear path located at the extraction end 120 of the apron feeder 100. The return rollers 170 support the sidewalls of the pans 185 as the pans 185 and endless chain 180 move along the lower rectilinear path. The pans 185 may be formed with an overlapping design to provide a tight seal and prevent leakage of material from the apron feeder 100.

An apron feeder has thus a complex structure with many individual elements or units that interact in a precise manner. Such a complex setup, however, gives rise to a plurality of different error sources. When a failure or inoperability of the apron feeder occurs, the specific cause of error has to be identified, e.g. to replace or readjust individual units of the apron feeder. These efforts take time and prolongs the downtime of an apron feeder.

Figure 2:
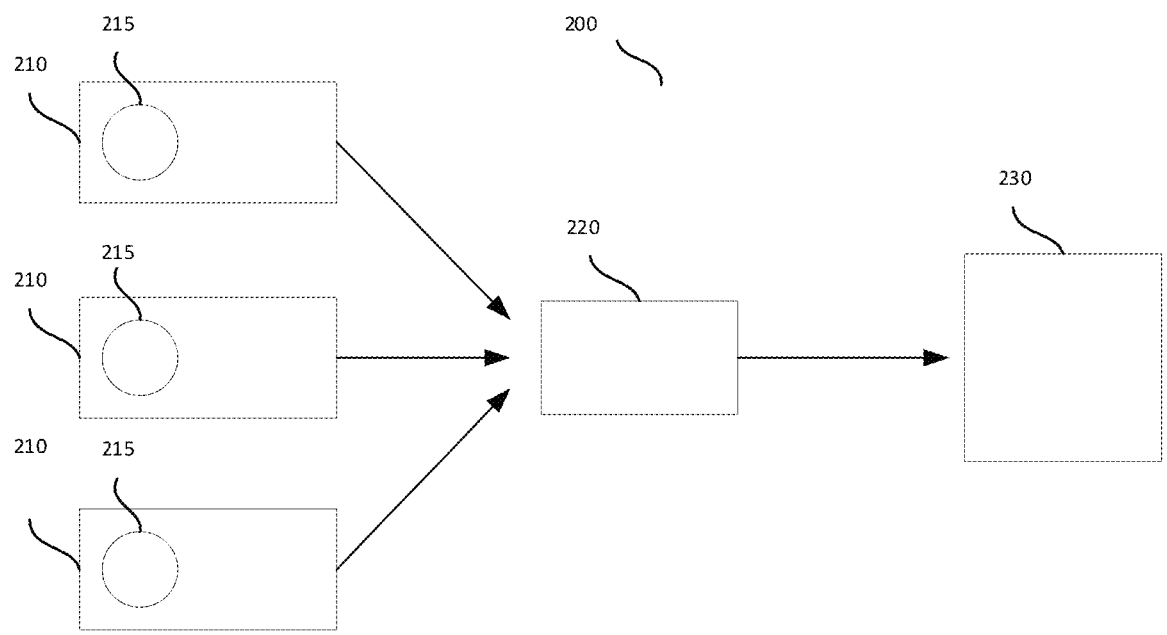
FIG. 2 shows an apron feeder intelligent monitoring system according to an embodiment of the invention.

In order to monitor the overall state of the apron feeder in real-time with a single system, an apron feeder intelligent monitoring system is provided which comprise several technology modules for monitoring the condition of each of a plurality of selected units of the apron feeder. Here, the inventors have identified core units of the apron feeder that should be individually monitored to determine individual conditions thereof and to determine an overall state of the apron feeder therefrom. The technology modules may be linked within the apron feeder intelligent monitoring system as shown in FIG. 2 below. For example, the technology modules are linked using a base station which passes the data of the technology modules to a processing unit as shown in FIG. 2.

Furthermore, the technology modules may be integrated into the apron feeder. Each module may be designed to detect specific conditions within the apron feeder and alert the operator maintenance planner in order to avoid undetected damages and wear and unplanned downtime.

FIG. 2 shows an apron feeder intelligent monitoring system according to an embodiment of the invention. The apron feeder intelligent monitoring system may be a system for continuously monitoring an apron feeder, the apron feeder having a plurality of units. By continuously monitoring the apron feeder, monitoring of the overall state of the apron feeder in real-time is possible.

As shown in FIG. 2, the apron feeder intelligent monitoring system 200 may comprise a plurality of sensor modules 210 of different types, wherein each sensor module 210 may refer to, be associated to, connected to, or built into a specific type of unit of the apron feeder and may comprise at least one sensor 215. Each sensor 215 may measure or detect an individual condition of a unit of the apron feeder, generate sensor data representing the measured individual condition, and transmit the generated sensor data.

In FIG. 2, each sensor module 210 has only one sensor 215. However, this is not limiting and each sensor module 210 may comprise more than one sensor 215 as mentioned above.

The sensor modules 210 of the system 200 are of different types which means that the sensor modules 210 refer to units of different types of the apron feeder. Units of different types means that each unit has a different function within the apron feeder compared to the other units, and the units may be placed at different positions in the apron feeder. Units of one type or one function are, for example, the carry rollers 160 as explained above. Units of other types may be the tail wheel 150, the return rollers 170, the endless chain 180, the pans 185, the head drive shaft 140, and the like.

The (individual) condition of a unit of the apron feeder (also called apron feeder unit) may indicate whether the apron feeder unit works properly within the apron feeder or whether irregularities occur in the apron feeder unit. Irregularities may happen due to damages or wear on the apron feeder unit. The condition of the apron feeder unit may be defined by a parameter or value within a range indicating the state or health of the unit and/or the degree of damage or wear.

Instead of using a parameter of value within a range for indicating the condition of the apron feeder unit, a binary parameter may be used. For example, the binary parameter value 1 indicates that no damage or wear has occurred on the apron feeder unit, while the binary parameter value 0 indicates that damage or wear has occurred. Transmitting merely such binary parameters may reduce response times of the monitoring system, for example, because data processing time can be reduced.

Furthermore, the system 200 may comprise a base station 220 which may collect the respectively different sensor data from the plurality of sensor modules 210 and transmit outbound data. The outbound data may be based on the collected sensor data. The outbound data may be transmitted to a processing unit 230 described below. For example, the outbound data may be the collected sensor data or data resulting from processing the collected sensor data at the base station 220. The processing may comprise compressing the collected sensor data, extracting the payload from the collected sensor data, data integrity checks, or the like.

For example, the base station 220 is a fixed or stationary base station which is fixed to the frame 130 of the apron feeder. However, instead of fixing the base station to the frame 130 of the apron feeder, the base station 220 may also be fixed to another part of the apron feeder or may be located in close proximity to the apron feeder without being fixed directly to a part of the apron feeder (which avoids mechanical influence, such as shaking, by the apron feeder).

Each sensor 215 of the plurality of sensor modules 210 may wirelessly transmit the generated sensor data to the base station 220, such that the base station 220 is able to collect the sensor data. In this regard, the base station may include one or more antennae to enable the wireless transmission between the sensors 215 and the base station 220. The wireless transmission may be performed by a short-range wireless network (e.g. IrDA, IEEE802.15.4, Zigbee, RF4CE, SP100, IEEE802.il, Bluetooth™, or similar technologies), by an intermediate-range wireless network (e.g. WLAN, GSM, GPRS, UMTS, 3GPP, LTE or similar technologies), or the like. Furthermore, the generated sensor data may be transmitted directly to the base station 220 via device-to-device (D2D) communication. D2D communication thereby is defined as direct communication between two devices without traversing another base station or core network. Existing data delivery protocols in D2D communications mainly assume that devices willingly participate in data delivery, share their resources with each other, and follow the rules of underlying networking protocols.

D2D communication may be, for example, realized by the Wi-Fi Direct standard, wherein the Wi-Fi Direct standard is a Wi-Fi standard enabling devices to easily connect with each other without requiring a wireless access point. Hence, Wi-Fi Direct is a single radio hop communication and becomes a way of communication wirelessly, much like Bluetooth. One advantage of Wi-Fi Direct is the ability to connect devices even if they are from different manufacturers, as only one of the Wi-Fi devices needs to be compliant with Wi-Fi Direct to establish a peer-to-peer connection that transfers data directly. In the case of the present invention, this means that not both the sensors 215 and the base station 220 may be compliant with Wi-Fi Direct, but only the base station 220 may need to be compliant with Wi-Fi Direct, while the sensors 215 may solely support WLAN (Wireless Local Area Network). Of course, it is also possible that the sensors 215 are compliant with Wi-Fi Direct, while the base station 220 supports WLAN.

Instead of wirelessly transmitting the generated sensor data, it is also possible to transmit the generated sensor data by wire, at least for some of the sensor modules, wherein the sensor modules 210 may be connected with the base station 220 by wire.

By collecting the various sensor data from a plurality of sensor modules of different types within a single base station, it is possible to monitor the overall state of the apron feeder in real-time with a single system. Thus, the installation of such a system is simplified.

Even though the system 200 is described as comprising one base station 220, the system 200 may also comprise more than one base station, each base station being similar to the base station 220.

To further simplify the installation of such a system, the base station 220 may perform a pairing process with the plurality of sensor modules 210. The pairing process may occur by, for example, using near field communication, a Bluetooth signal, entering a PIN or other identification, scanning a bar code or QR code, taking a picture of an identification label, using a label having an identification number, or pressing a button on one or all of the devices to be paired, i.e. sensors 215 of the sensor modules 210 and the base station 220. It is also possible that the base station 220 and the sensor modules 210 are pre-paired, for example during manufacturing. Thus, it is possible to transmit sensor data from the sensor modules 210 to the base station 220 without the need to perform a complicated installation by the operator of the apron feeder.

The system 200 may further comprise a processing unit 230 which may receive the outbound data from the base station 220 and analyse the outbound data for determining whether or not any of the unit(s) of the apron feeder needs to be replaced or readjusted based on its individual condition. The unit may need to be replaced or readjusted when its individual condition does not meet a predetermined threshold. Then, the processing unit 230 may generate a result of the determination for continuously indicating a state of the apron feeder. The state of the apron feeder 100 may be understood as the overall state or health of the apron feeder. The overall state or health of the apron feeder may be obtained or derived from the individual conditions of the respective units, e.g. by considering the sum of the conditions of the units. For example, when the majority of the apron feeder units are in a valid (e.g. operable) condition and do not need to be replaced or readjusted, the overall state of the apron feeder may be cleared and no repairments, replacements or readjustments by the operator of the apron feeder may be necessary. However, when the majority of the apron feeder units are in an invalid condition (e.g. operable with limitations) and need to be replaced or readjusted, the overall state of the apron feeder may not be cleared and repairments, replacements or readjustments by the operator of the apron feeder may be necessary.

The processing unit 230 may be a processor, a computer workstation, or the like. Even though the base station 220 and the processing unit 230 are shown as separate units, the base station 220 and the processing unit 230 may be in the same physical unit.

Similar with the transmission of the generated sensor data from the sensors 215 to the base station 220, the base station 220 may transmit the outbound data to the processing unit 230 wirelessly or by wire. For the wireless transmission, a short-range wireless network, an intermediate-range wireless network, D2D communication, or the like may be used.

By combining the individual sensor modules 210 within a single apron feeder intelligent monitoring system, collecting the various sensor data by a single base station 220, and continuously monitoring an apron feeder by the processing unit 230, it is possible to monitor the state or health of the apron feeder in real-time, ensure simple installation of the apron feeder intelligent monitoring system, minimise the apron feeder downtime, and assist with shutdown planning.

The apron feeder intelligent monitoring system may include equipment setup parameters that may be required to monitor the sensor modules and the apron feeder. The equipment setup parameters may represent the type of and number of technology modules or sensor modules that are fitted to the apron feeder. The equipment setup parameters may also represent pre-set warning and alarming limits or thresholds to be provided for each fitted technology module or sensor module.

As shown in FIG. 2 and as explained above, the system 200 may comprise a plurality of sensor modules 210. Below, the sensor modules 210 are now described in more detail.

The sensor modules may be a pan module, a return roller module, a tail wheel module, a gearbox module, a chain module or the like. The plurality of sensor modules 210, being comprised in the system 200 for continuously monitoring the apron feeder may thus comprise at least one of the pan module, the return roller module, the tail wheel module, the gearbox module, and the chain module. The plurality of sensor modules 210 may further comprise another type of module in addition to the at least one of the pan module, the return roller module, the tail wheel module, the gearbox module, and the chain module chosen above.

The plurality of sensor modules 210, being comprised in the system 200 for continuously monitoring the apron feeder may also comprise at least two of the pan module, the return roller module, the tail wheel module, the gearbox module, and the chain module. For example, the plurality of sensor modules 210 comprises the pan module and the return roller module or other combinations of the different types of modules.

Figure 3:
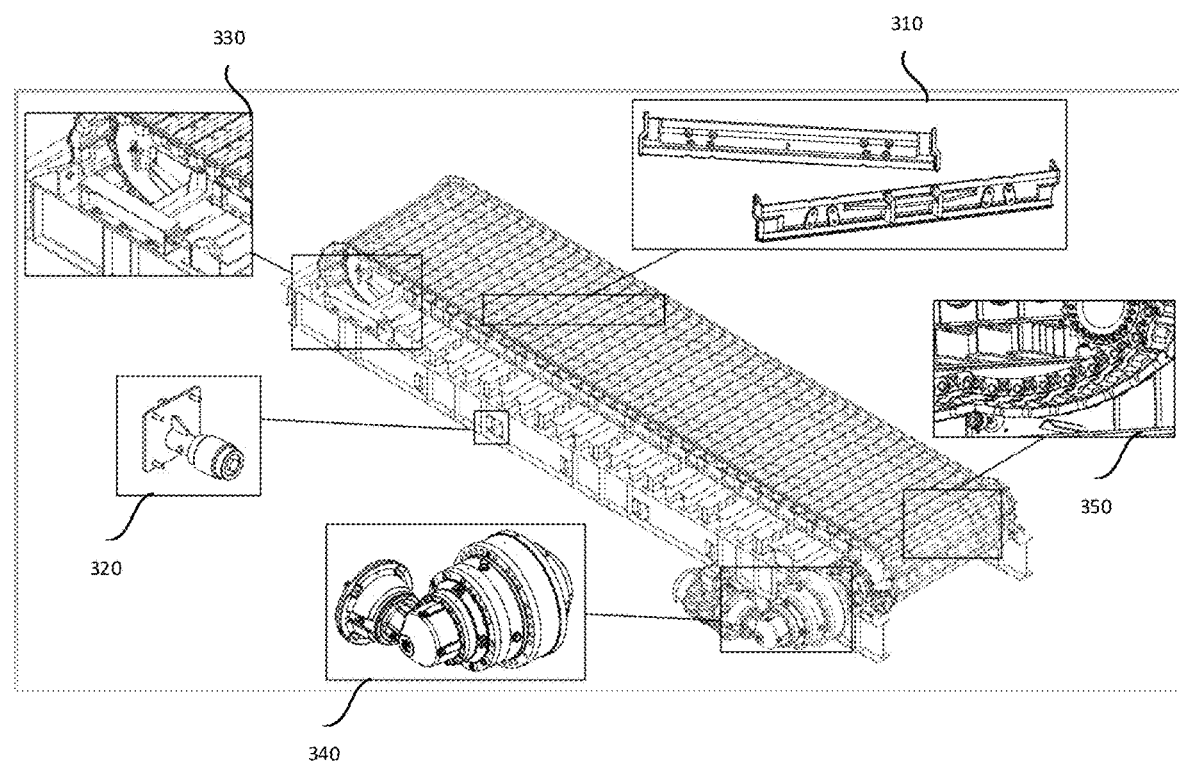
FIG. 3 shows the apron feeder intelligent monitoring system associated to an apron feeder according to an embodiment of the invention.

For further describing the different types of sensor modules 210, it is referred to FIG. 3. FIG. 3 shows the apron feeder intelligent monitoring system associated to an apron feeder according to an embodiment of the invention.

In FIG. 3, the apron feeder is similar to the apron feeder 100 shown in FIG. 1 and comprises the apron feeder units as described above, i.e. the tail wheel 150, the head drive shaft 140, the carry rollers 160, the return rollers 170, the endless chain 180, the pans 185, and the like.

Further to the apron feeder units, FIG. 3 shows an embodiment of the pan module 310, the return roller module 320, the tail wheel module 330, the gearbox module 340, and the chain module 350. As described above, it is not necessary that the apron feeder intelligent monitoring system comprises all the modules 310 to 350. It may be sufficient when the apron feeder intelligent monitoring system comprises at least one of the modules 310 to 350 and another type of module.

Below, the various sensor modules 310 to 350 are described in more detail.

The Pan Module 310

The pan module 310 may refer to at least one pan of the apron feeder. The pan module 310 may be an integral part of the apron feeder and co-exist with other modules 320 to 350 of the apron feeder intelligent monitoring system. The pan module 310 may also be fitted to the pan of the apron feeder without integrating the pan module 310 into the apron feeder.

The pan module 310, also called the feeder flight module or feeder pan module, may be substituted in place of one or more of the standard pans of the apron feeder and may be based on the length of the apron feeder. For example, the pan module 310 is at least one apron feeder pan which, in contrast to a standard pan of the apron feeder, further comprises at least one pan wear sensor. The pan wear sensor may measure the condition of a pan of the apron feeder. For example, if the pan module 310 is one apron feeder pan, the pan module 310 is substituted in place of one standard pan of the apron feeder. If the pan module 310 is two or more apron feeder pans, the pan module 310 is substituted in place of two or more standard pans, wherein each pan of the pan module 310 comprises at least one pan wear sensor.

As described above, the apron feeder pans are attached to an endless chain to provide a defined carry surface for the transportation of the product. When the pan module 310 is substituted in place of one or more standard pans, the pan module 310 together with the remaining standard pans which have not been replaced by the pan module 310 are attached to the endless chain to provide the defined carry surface.

The standard apron feeder pans and the pan module 310 may be fixed to the endless chain with heavy duty high strength bolts. Both the standard pans and the pan module 310 may extend transversely across the apron feeder. The standard pans and/or the pan module 310 may be manufactured from alloy steel material that is resistant to high impact loading and abrasion.

The pan module 310 may be located anywhere along the endless chain of the apron feeder. If the pan module 310 is at least two apron feeder pans, each pan including at least one pan wear sensor, the pan module 310, i.e. the apron feeder pans with the wear sensors may be installed at equidistant locations along the endless chain.

The wear rate of the apron feeder pans can be considered uniform along the length of the endless chain because of uniform abrasion across the pan deck. Thus, it may be enough to provide one apron feeder pan with at least one pan wear sensor for measuring the overall condition of the apron feeder pans.

However, even though it may be sufficient to provide one apron feeder pan with at least one pan wear sensor, it may be desirable to provide a pan module 310 with at least two apron feeder pans, each pan comprising at least one pan wear sensor, in order to improve the measurement reliability regarding the pan condition. By providing at least two apron feeder pans within the pan module 310, installing these apron feeder pans along the endless chain, and measuring the amount of wear at different locations along the endless chain, the condition of the pans can be measured more reliably along the endless chain. For example, if sensor data is received from sensors of a plurality of apron feeder pans, faulty or incorrect sensor data can be sorted out or compensated by averaging the sensor data or the like. Furthermore, outliers may be detected and may be eliminated. In addition, the pan module 310 may still be used even if one apron feeder pan fails, providing redundancy.

Each pan wear sensor may measure an amount of wear of the pan due to objects being transported by the apron feeder, wherein the processing unit may determine that the pan of the apron feeder needs to be replaced when the amount of wear exceeds a predetermined pan threshold. It may be necessary to replace all the pans of the apron feeder or just specific pans depending on the amount of wear. If less pan wear sensors than pans within the apron feeder are used and thus the amount of wear is not measured individually for each pan, extrapolation is used over the total amount of pans within the apron feeder. The operator of the apron feeder may decide to replace a pan by visually inspecting the pans once the processing unit determines that the pans of the apron feeder may need to be replaced.

The predetermined pan threshold may be a pre-set parameter stored in a storing unit (not shown) of the processing unit 230. It is also possible that the predetermined pan threshold is stored in a database or a storing unit which does not belong to the processing unit 230, wherein the processing unit 230 has access to the database for retrieving the predetermined pan threshold.

According to another example, the predetermined pan threshold may be also set by the operator of the apron feeder when starting the apron feeder intelligent monitoring system 200 or may be set by a supplier of the pans. Intermediate warnings may be adjusted given the correct authority or access level.

The predetermined pan threshold may represent a maximum amount of wear that is still allowable before replacing the pan.

According to an embodiment, each pan wear sensor may be attached to the apron feeder pan by a screwed connection that may pass through the thickness of the pan and may be flush with the top of the surface of the pan, i.e. the carry surface. Integrated within the screwed connection may be electrical circuits for measuring the length of the screw. The electrical circuits may be housed within and through the centre of the screwed connection. The top of the screwed connection remains level with the top of the pan as the pan wears. The interruption/measurement of the remaining electrical circuits provides a measure of the remaining screw length, i.e. pan thickness. The measured length or pan thickness may be the generated sensor data that are transmitted by the pan wear sensor.

At the base of the screwed connection may be a small enclosure housing the necessary electronics, power supply and antenna. The antenna may be needed to wirelessly transmit the generated sensor data to the base station 220.

As the pans of the apron feeder wear, due to the transportation of heavy material, the length of the pan wear sensor, i.e. the screw which may be a sensor screw connection, may be reduced. The pan wear sensor may measure the remaining length of the screw and may determine the amount of wear by comparing the remaining length of the screw with the initial length of the screw. Thus, the amount of wear may be the difference between the initial length of the screw and the remaining length of the screw.

The amount of wear may be the measured condition of the apron feeder pans, wherein the pan wear sensor generates sensor data representing the amount of wear. The generated sensor data may be transmitted from the pan wear sensor to the base station 220 providing a real-time measurement of the remaining apron feeder pan thickness and thus the pan wear. The generated sensor data may be periodically transmitted or may be transmitted at a certain time, for example every six to twelve hours, or may be transmitted as requested by the base station 220, depending on the battery life and pan life.

Return Roller Module 320

Now, the return roller module 320 is described in more detail.

The return roller module 320 may refer to at least one return roller 170 of the apron feeder, wherein the return roller module 320 may comprise at least one return roller rotation sensor. For example, the return roller module 320 is substituted in place of one or more of the standard return rollers of the apron feeder, the standard return rollers of the apron feeder not comprising a return roller rotation sensor. According to another example, the return roller module 320 may refer to a return roller assembly, wherein the return roller assembly comprises the return rollers 170 on both sides of the assembly frame 130.

The standard return rollers, and thus similarly also the return roller module 320, may be attached to the main frame support beams of the apron feeder frame 130. The standard return rollers and the return roller module 320 may be installed through pre-existing openings in the main frame support beams. The return rollers are positioned on the apron feeder frame 130 at multiple locations on both sides of the apron feeder frame 130 in order to support the sidewalls of the apron feeder pans and endless chain as they traverse underneath the carry surface during operation of the apron feeder.

As mentioned above, the return roller module 320 may comprise at least one return roller rotation sensor. The return roller rotation sensor may measure the condition of a return roller of the apron feeder. In particular, the return roller rotation sensor may detect movement of the return roller by measuring the rotational speed of the return roller, wherein the processing unit 230 of the apron feeder intelligent monitoring system 200 may determine that the return roller of the apron feeder needs to be replaced when the rotational speed is smaller than a predetermined return roller threshold. The data transmission from the return roller rotation sensor to the processing unit 230 may be intermittent to extend sensor life. By providing a plurality of return roller rotation sensors, the rotational speed across the return rollers within the apron feeder can be compared.

For example, the return roller rotation sensor is a single wireless sensor built in a return roller, the return roller with the wireless sensor replacing a standard return roller 170 without sensors. However, it is also possible that the return roller rotation sensor is a sensor not built in a return roller but mounted to each return roller assembly.

According to an embodiment, a gyroscope or three-axis accelerometer may be integrated within the return roller rotation sensor. The gyroscope may measure the angular velocity of the return roller sensor and thus of the return rollers of the apron feeder. The return roller rotation module 320 may be used to measure the rotation, in particular the rotational speed, of the return roller as the apron feeder pans sidewalls move across the radial surface of the apron feeder.

The measured rotational speed may be compared with a predetermined return roller threshold. The predetermined return roller threshold may be pre-set and stored in the storing unit of the processing unit 230. It is also possible that the predetermined return roller threshold is stored in a database or a storing unit which does not belong to the processing unit 230, wherein the processing unit 230 has access to the database for retrieving the predetermined return roller threshold. The predetermined return roller threshold may be pre-set by a supplier of the return rollers or apron feeder.

However, it is also possible that an operator of the apron feeder sets the predetermined return roller threshold when starting the apron feeder intelligent monitoring system 200. For example, the predetermined return roller threshold is a minimum rotational speed of the return rollers that must be present in the system to ensure proper operation of the apron feeder. The processing unit 230 may determine that a single return roller or a plurality of return rollers of the apron feeder need to be replaced when the rotational speed is smaller than the predetermined return roller threshold.

At the base of the return roller rotation sensor may be a small enclosure housing the necessary electronics, power supply and antenna. Each return roller rotation sensor may wirelessly connect to the base station 220 via a wireless connection, as described above. However, if the return roller rotation sensor is connected to the base station 220 by wire, the antenna of the return roller rotation sensor may be replaced by a plug or connector to be able to be connected to the base station 220.

By continuously or intermittently monitoring the return rollers 170 rotation in real-time, it is possible to detect any reduced rotational speed or non-rotation which will indicate any damage to the return rollers 170. Non-rotation of return rollers 170 may cause an increase in power consumption due to the dragging action of the pan sidewall surface on a stationary return roller. Collecting the sensor data transmitted by one return roller rotation sensor or by collecting and comparing sensor data from multiple return roller rotation sensors located in different return rollers, it is possible to determine the wear on the return rollers 170 and identify any potential issues prior to damage. Comparing sensor data from multiple return roller rotation sensors may comprise monitoring the rotational speed of various return rollers at a specific point in time and comparing the rotational speed of the various return rollers with each other. By comparing the rotational speed, return rollers can be identified which operate at a different speed.

The return roller rotation module 320 is also capable of providing an indication of non-rotation which may be caused by incorrect setup, failed bearings, radial flat spots, material build-up and the like.

Tail Wheel Module 330

Now, the tail wheel module 330 is described in detail below.

First, the tail wheel 150 is further explained. The tail wheel may be mounted to an (adjustment) frame 151 or tail wheel take-up assembly that can be longitudinally adjusted. The tail wheel may be mounted to the (adjustment) frame 151 or tail wheel take-up assembly either with a common through shaft, like the head pulley, or with separate rollers mounted to the frame 151. The adjustment frame 151 is highlighted in FIG. 1 with a black box. The tail wheel take-up assembly or frame 151 may be adjusted using a mechanical screw arrangement, integrated hydraulic cylinders or the like. The adjustment of the frame 151 may be necessary during setup and operation of the apron feeder to ensure that the correct chain tension of the endless chain and alignment between the tail wheel frame, the drive sprockets and the carry rollers is provided. In particular, it is critical to maintain the parallelism between the tail wheel take-up assembly and the head drive shaft due to the mechanical arrangement of the endless chain and feeder pans. An off-set of the frame 151 may be measured at a position shown within the circle having the reference sign 153 in FIG. 1.

Thus, it is useful to continuously monitor the chain sag and the tail wheel alignment in order to ensure improved apron feed operation. For monitoring the tail wheel alignment, the tail wheel module 330 may be used, wherein the monitoring of the chain sag, i.e. deviation of the chain from a known, ideal position, is described with regard to the chain module 350.

The tail wheel module 330 may refer to a tail wheel assembly. The tail wheel assembly may refer to the tail wheel 150 of the apron feeder and/or the tail wheel take-up assembly/frame 151. The tail wheel module 330 may be located at the tail end of the apron feeder, the tail end being similar to the extraction end 120 shown in FIG. 1. The tail wheel module 330 may be connected to the tail wheel 150 or may be integrated within the tail wheel 150.

The tail wheel module 330 may be used to continuously measure the alignment of the tail wheel 150. The tail wheel module 330 may comprise at least one tail wheel alignment sensor. The tail wheel alignment sensor may be mounted to a longitudinal support beam of the apron feeder. For example, the tail wheel module 330 may comprise a plurality of tail wheel alignment sensors, one tail wheel alignment sensor for each longitudinal support beam. The tail wheel alignment sensor may measure the distance between a fixed point, for example the head of the tail wheel alignment sensor, and the tail wheel.

According to an embodiment, the tail wheel alignment measurement may be taken either from the jacking point A (see FIG. 1B) to the tail wheel assembly or from the beam I (see FIG. 1B) to the tail wheel assembly.

The tail wheel alignment sensor may measure the condition of the tail wheel 150 of the apron feeder. For example, the condition of the tail wheel 150 refers to the alignment of the tail wheel 150. Thus, the tail wheel alignment sensor may measure an alignment offset of the tail wheel 150, and the processing unit 230 may determine that the tail wheel 150 needs to be readjusted when the alignment offset exceeds a predetermined tail wheel threshold.

According to an example, a comparison between the distances measured by a plurality of tail wheel alignment sensors mounted on either side of the apron feeder may provide the alignment offset. For example, at least two tail wheel alignment sensors are provided.

The predetermined tail wheel threshold may be pre-set and stored in the storing unit of the processing unit 230. It is also possible that the predetermined tail wheel threshold is stored in a database or a storing unit which does not belong to the processing unit 230, wherein the processing unit 230 has access to the database for retrieving the predetermined tail wheel threshold.

According to another example, the predetermined tail wheel threshold may be also set by the operator of the apron feeder when starting the apron feeder intelligent monitoring system 200. The predetermined tail wheel threshold may also be pre-set by the supplier within known values and ranges.

The predetermined tail wheel threshold may represent a maximum alignment offset that is still allowable for a correct operation of the apron feeder. When the maximum alignment offset is, however, exceeded, the tail wheel 150 must be realigned.

Gearbox Module 340

Now, the gearbox module 340 is described in great detail below.

An apron feeder can be operated using a variety of drive technologies, wherein the most common drive technologies is a combination of an electric motor (not shown) and a gearbox. As shown in FIG. 3, the gearbox may be located at the head end of the apron feeder, the head end being similar to the discharge end 110 shown in FIG. 1.

The gearbox may be a critical component of the apron feeder. Failure or degraded operation of the gearbox can cause a major impact to the overall operation. The gearbox may convert a high speed, low torque (relative to output) input and converts it through a series of gears to a low speed, high torque output. The output may be then used to rotate the drive sprockets and move the apron feeder pans around the assembly. Depending upon the design of the gearbox, the internal gears may be lubricated naturally by passing through an oil sump or by a pressurised oil system that pumps the oil within the gearbox. To ensure the reliability of the gearbox, it is thus necessary to continuously monitor the oil, like the oil quality.

The gearbox module 340 may be used to continuously monitor the characteristics of the oil within the gearbox unit. By monitoring the oil, it is possible to extrapolate potential issues that are otherwise hidden within the unit of the apron feeder without the requirement to stop the apron feeder for taking an oil sample.

According to an embodiment, the gearbox module 340 may refer to a gearbox of the apron feeder. The gearbox module 340 may be located within the gearbox or may be placed next to the gearbox and may be connected with the gearbox.

The gearbox module 340 may comprise at least one gearbox oil monitoring sensor which may measure the condition of oil within the gearbox of the apron feeder. For example, the gearbox oil monitoring sensor is fitted to the gearbox and protrudes into the oil sump of the gearbox. The gearbox oil monitoring sensor may measure a parameter of the oil within the gearbox, the parameter representing characteristics of the oil, wherein the processing unit may determine that the oil within the gearbox needs to be replaced when the parameter exceeds a predetermined oil threshold. Characteristics of the oil may be the oil temperature, oil particulate quantity, contamination of the oil e.g. water ingress, or the like.

For example, the gearbox module 340 comprises one gearbox oil monitoring sensor which may comprise a measuring technology or multiple measuring technologies for monitoring at least one of the oil temperature, oil particulate quantity, and contamination of the oil e.g. water ingress. According to another example, the gearbox module 340 may comprise a plurality of gearbox oil monitoring sensors, each gearbox oil monitoring sensor measuring a different characteristic of the oil.

The sensor data from the gearbox oil monitoring sensor may be continuously monitored by the base station 220, wherein the sensor data may be wirelessly transmitted by an antenna of the gearbox oil monitoring sensor or transmitted by wire, see also the explanation given with the previously described modules.

The predetermined oil threshold may be pre-set and stored in the storing unit of the processing unit 230. It is also possible that the predetermined oil threshold is stored in a database or a storing unit which does not belong to the processing unit 230, wherein the processing unit 230 has access to the database for retrieving the predetermined oil threshold.

According to another example, the predetermined oil threshold may be also set by the operator of the apron feeder when starting the apron feeder intelligent monitoring system 200. The predetermined oil threshold may also be pre-set by the supplier and not the operator.

The predetermined oil threshold may be a value or parameter that should not be exceeded by the oil characteristics to ensure proper and correct apron feeder operation. The predetermined oil threshold may be at least one parameter representing a maximum and/or minimum oil temperature, a maximum and/or minimum oil particulate quantity and a maximum amount of oil contamination.

By continuously monitoring the gearbox oil, it is possible to continuously determining the oil quality and determining a time when the gearbox oil must be replaced. Thus, undetected failures are avoided which would otherwise result from deteriorated oil.

Chain Module 350

Lastly, the chain module 350 of the apron feeder intelligent monitoring system 200 is described. The chain module 350 is used for monitoring the endless chain, like a crawler chain.

The endless chain has several important functions within the apron feeder. First of all, the endless chain connects the apron feeder pans to provide a continuous carry surface for the material to be transported by the apron feeder. Second, the endless chain provides the movement within the apron feeder by engaging with the drive sprockets 141. As drive sprockets 141 rotate, the engagement of the teeth into the endless chain moves the pans along an elongated circular path. Third, the endless chain maintains the alignment of the pans along the movement path.

However, to ensure correct operation of the apron feeder, it is necessary to setup the endless chain with the correct chain tension. Incorrect tension may cause excessive chain wear, excessive sprocket wear, mis-aligned pan movement, and damaged carry rollers.

Thus, the chain module 350 may be provided within the apron feeder intelligent monitoring system 200 to continuously monitor the chain sag, i.e. droop of the chain under pinion against a pre-determined level, in real-time.

According to an embodiment, the chain module 350 may refer to the endless chain, like the crawler chain, of the apron feeder. The chain module 350 may be integrated within the endless chain or may be located close to the endless chain and may be connected with the endless chain. The chain module 350 may be located at the head end of the apron feeder.

The chain module 350 may comprise at least one chain sag sensor. The chain sag sensor may measure the condition of the endless chain of the apron feeder. For example, the chain sag sensor may measure a sag parameter of the endless chain, the sag parameter representing the chain sag of the endless chain, wherein the processing unit may determine that the tail wheel needs to be readjusted when the sag parameter exceeds a predetermined chain sag threshold.

The chain sag sensor may be mounted to the apron feeder frame 130. If the chain module 350 comprises a plurality of chain sag sensors, the chain sag sensors may be mounted to the apron feeder frame 130 in transverse direction. The chain sag sensors may be installed at equidistant locations. For example, there is only a single set of two chain sag sensors aligned above the endless chain, the sensors facing the back of the pans. Even though the chain module 350 works with one chain sag sensor per monitored endless chain, the accuracy of the chain sag measurement may be improved when installing a plurality of chain sag sensors, as the endless chain can be observed over its entire length.

The at least one chain sag sensor may be aligned with the underside of the endless chain as it traverses from the drive sprockets 141 to the first set of return rollers 170.

Each chain sag sensor may measure the distance between a fixed point, like the sensor head, and the endless chain. Measuring the distance between each chain sag sensor and the endless chain may provide a real-time indication of the amount of sag or droop within the endless chain. Sag of the endless chain is a function of the chain tension. For example, the apron feeder is setup based on a nominal amount of sag as measured from the horizontal. The deviation from this nominal amount is monitored, wherein any calculated or extrapolated figure may be used. The lower the tension, the more the endless chain tends to sag or droop. In contrast thereto, a high tension causes the endless chain to lift towards the sensor head. Maintaining the correct tension is critical to the apron feeder operation and in prolonging the life of the equipment.

The sag parameter may be one parameter or a set of parameters. The sag parameter may be the distance measured between the chain sag sensor and the endless chain. If a plurality of distances is measured by a plurality of chain sag sensors, the sag parameter may comprise all the measured distances. However, it is also possible that the sag parameter is only the minimum distance and/or the maximum distance among the measured distances, the minimum distance representing the highest amount of sag, the maximum distance representing the lowest amount of sag. The distance measured by the chain sag sensor may also be converted to the chain tension by the function, wherein the sag parameter may be the converted chain tension. Any calculated/extrapolated figure may be used to convert to the chain tension.

The predetermined chain sag threshold may be pre-set and stored in the storing unit of the processing unit 230. It is also possible that the predetermined chain sag threshold is stored in a database or a storing unit which does not belong to the processing unit 230, wherein the processing unit 230 has access to the database for retrieving the predetermined chain sag threshold.

According to another example, the predetermined chain sag threshold may be also set by the operator of the apron feeder when starting the apron feeder intelligent monitoring system 200. Instead of the operator, the supplier of the apron feeder may pre-set the predetermined chain sag threshold.

The chain sag threshold may be a specific distance range indicating the ideal chain tension. For example, the chain sag threshold is a distance range of 50 to 75 mm from the head to the back of the endless chain. If the sag parameter falls outside such a distance range (over tension above 50 mm; under tension below 75 mm), the chain tension is not ideal and the chain tension must be readjusted by, for example, realigning and moving the tail wheel 150.

By continuously monitoring the chain tension, it is possible to avoid damages and wear to the units of the apron feeder due to too low or too high chain tension. Thus, the correct chain tension is maintained within the apron feeder.

Herewith, the sensor modules 310 to 350 of the apron feeder intelligent monitoring system 200 have been described in detail. By continuously monitoring the individual units of the apron feeder with one system that combines the sensor data of various sensor modules of different types, the overall state or health of the apron feeder can be easily monitored in real-time without great effort. Furthermore, failures and wear on the units can be quickly determined and repairs can be planned and initiated at the right time to avoid excessive damages to the apron feeder.

FIG. 4 shows the apron feeder intelligent monitoring system associated to an apron feeder according to another embodiment of the invention.

The apron feeder intelligent monitoring system 400 shown in FIG. 4 comprises a pan module 410, a return roller module 420, a tail wheel module 430, a gearbox module 440, and a chain module 450, each module having at least one sensor. The pan module 410, the return roller module 420, the tail wheel module 430, the gearbox module 440, and the chain module 450 are similar to the pan module 310, the return roller module 320, the tail wheel module 330, the gearbox module 340, and the chain module 350 described above. Thus, a detailed description of the modules 410 to 450 is omitted at this point for conciseness reasons.

Furthermore, FIG. 4 shows drive sprockets 465 of the apron feeder intelligent monitoring system 400, the drive sprockets 465 being equal to the drive sprockets 141 as described with regard to FIG. 1. The drive sprockets have teeth which cooperate with the individual links of the endless chain 455 to drive the endless chain 455. The endless chain 455 is equal to the endless chain described with great detail above.

Linked to the drive sprockets 465 may be a drive sprocket module 460 having a plurality of sensors. The sensors may measure the wear on the teeth of the drive sprockets 465 to determine whether or not the drive sprockets 465 need to be replaced. For measuring the wear, measurement techniques like the one described with regard to the sensor modules 310 to 350 may be used.

In FIG. 4, the apron feeder intelligent monitoring system 400 comprises the whole set of sensor modules 410 to 460. However, the apron feeder intelligent monitoring system 400 is not limited thereto and the apron feeder intelligent monitoring system 400 may include less or even more sensor modules. It may be desired to have an apron feeder intelligent monitoring system 400 comprising a plurality of senor modules of different types, the number of sensor modules being variable and being set up by the operator of the apron feeder. As described above, the sensor modules are of different types when the sensor modules refer to units of different types of the apron feeder. Units of different types mean that each unit has a different detection function within the apron feeder compared to the other units.

As further shown in FIG. 4, the apron feeder intelligent monitoring system 400 may generate a system health report 401 i.e., graphical trends, dates and/or times of warnings and/or alarms, and the like concerning the sensor modules and apron feeder units.

As furthermore shown in FIG. 4, the sensor modules 410 to 460 may be connected to a base station 470 wirelessly or by wire. The base station 470 is equal to the base station 220 described with regard to FIG. 2. Thus, a detailed description of the base station 470 is omitted at this point for conciseness reasons. The sensors of the sensor modules 410 to 460 may transmit the generated sensor data representing the measured conditions of the apron feeder units to the base station 470 via short-range wireless network, intermediate-range wireless network, D2D, Ethernet or the like. Thus, the sensor data from all sensor modules are collected within one base station 470.

The base station 470 may transmit outbound data to a processing unit 480, the processing unit 480 being equal to the processing unit 230 described with regard to FIG. 2. Thus, a detailed description of the processing unit 480 is omitted at this point for conciseness reasons. The outbound data is based on the collected sensor data. For example, the outbound data is the collected sensor data. However, the base station 470 may also perform compression techniques on the collected sensor data, retrieve the payload from the collected sensor data, or the like to obtain the outbound data. The base station 470 may transmit the outbound data wirelessly or by wire to the processing unit 480, such as via a short-range wireless network, intermediate-range wireless network, D2D, Ethernet or the like.

The apron feeder intelligent monitoring system may further comprise a display unit which may display the result of the processing unit. As shown in FIG. 4, the processing unit 480 may transmit its result of determination for continuously indicating an overall state of the apron feeder and individual conditions or states of the respective units of the apron feeder to the display units 495. The display units 495 may be any unit that can display the results, like a computer with a computer monitor, a table, a smartphone, a screen, or the like. The processing unit and the display unit may not be physically separated units and may, for example, be integrated into a single computer, computer workstation or the like.

The processing unit 480 may transmit the result of determination directly to the display units 495, either wirelessly or by wire. However, the processing unit 480 may also transmit the result of determination to the display units 495 via a Cloud system 490. The Cloud system 490 may store the result of determination for wirelessly transmitting the result of determination to the display units 495. The wireless transmission from the Cloud system may be performed periodically or automatically, such that the display units 495 can continuously display the result of determination in real-time, or the wireless transmission from the Cloud system may be performed once the display units 495 request for the result. An advantage regarding the Cloud system is that the display units 495 can be located anywhere, not even close to the processing unit 480, while the transmission of the result of determination can still be ensured. By using cloud-based technologies, real-time diagnostics and reporting can be provided.

The result of determination may indicate whether or not a unit of the apron feeder needs to be replaced or readjusted. By displaying the result of determination, the operator of the apron feeder can immediately see with one glance the overall state or health of the whole apron feeder.

For example, predetermined setpoints within the visualization by the display unit 495 provide a clear indication of the remaining material thickness of the installed apron feeder pans. Combining the remaining material thickness data with plant process data may allow time-based extrapolation of an expected apron feeder pan end-of-life time and date-based prediction. Plant process data may comprise production data, expected equipment throughput, material, operational speeds, or the like.

Based on the expected apron feeder pan end-of-life time, the operator of the apron feeder may plan the timing when to stop the apron feeder and to replace the apron feeder pans.

According to another example, a series of limits are programmed within the display unit 495 and provide clear indication of a non-rotation of the return rollers or limited rotation of the return rollers. Thus, the operator of the apron feeder is able to quickly check the conditions of the return rollers and to immediately decide when to replace the return rollers.

According to another example, predetermined setpoints are provided within the visualization by the display unit 495 to provide a clear indication of the alignment offset with regard to the tail wheel. The visualization may provide guidance on how to rectify the tail wheel alignment. Thus, the operator of the apron feeder is able to quickly check the tail wheel alignment and to quickly decide when and how to readjust the tail wheel alignment.

According to another example, a series of limits are pre-programmed into the display unit 495 that allow for visualization of both over and under chain sag within the apron feeder. The visualization may provide the operator guidance for rectifying the over and under chain tension. Thus, the operator of the apron feeder is able to quickly check the chain tension and to quickly decide when and how to readjust the tail wheel to correct the chain tension.

According to another example, visualization of the characteristics of the gearbox oil, such as oil quality, temperature, and contamination levels, by the display unit 495 is provided. The measured sensor data combined with target or reference information may provide a useful indication of the condition or health of the gearbox. Thus, the operator of the apron feeder is able to quickly check the gearbox oil quality and to quickly decide whether or not the gearbox oil needs to be replaced.

In summary, predetermined setpoints, a series of limits, target or reference information, or the like for the sensor data within the visualisation by the display unit 495 are useful to provide a clear and early indication of internal or external damages and/or operational issues regarding the apron feeder without stopping the operation feeder or removing and disassembling the apron feeder units.

According to another embodiment, the visualization by the display unit 495 or result of the processing unit 230, 480 may further provide guidance on rectifying, warnings, and alarms to help the operator of the apron feeder noticing damages and replacing or readjusting the units of the apron feeder. Maintenance tasks and parts catalogue integration may be included as part of the apron feeder intelligent monitoring system. The maintenance tasks and parts catalogue integration may comprise general equipment maintenance information not covered specifically by a sensor module, e.g. grease moving parts, visual inspection, and statutory reminders which are all based on time. This may be shown via a popup or general maintenance page on the display unit 495.

An actual equipment manual may be integrated into the processing unit 480 to provide drawings and part numbers for the equipment monitored by the sensor modules.

For example, if a unit of the plurality of units of the apron feeder needs to be replaced or readjusted, the processing unit 230, 480 may indicate an instruction for instructing how to replace or readjust the unit of the apron feeder, wherein the display unit may display the generated instruction. The instruction may be any kind of information that explains to the operator how to correctly replace or readjust the various kinds of apron feeder units. The display unit 495 may display the instruction as a step-by-step instruction which explains the replacement or readjustment of the apron feeder unit in a step-by-step manner. The step-by-step instruction may be in text form or in images. The step-by-step instruction may also be in both text form and images leading to interactive visualisation. The display unit 495 may also play a video which shows the correct replacement or readjustment of the apron feeder unit. The instruction may be in any kind of language that can be selected by the operator. Thus, it is ensured that the operator can quickly and correctly replace and readjust the apron feeder units without further damaging the apron feeder units.

The processing unit 230, 480 may generate the instruction and/or may refer to a storing unit where the instruction is to be found. The storing unit may store the instruction and may be part of the processing unit 230, 480, wherein the processing unit 230, 480 can retrieve the instruction from the storing unit to transmit the instruction to the display unit 495 for displaying. In contrast thereto, the storing unit may also be an external storing unit or data base outside of the processing unit 230, 480, wherein the processing unit 230, 480 can access the storing unit wirelessly or by wire for retrieving the instruction.

Instead of or in addition to retrieving the instruction from the storing unit and transmitting the instruction to the display unit 495, the processing unit 230, 480 may also send a location information to the display unit 495, the location information indicating where to find the instruction. For example, the location information indicates in which text book, in which manual, on which website, or the like the instruction can be found. When the display unit 495 displays the location information, the operator knows where the instruction for replacement or readjustment can be exactly found. Thus, it is ensured that the operator quickly and correctly replaces and readjusts the apron feeder units without further damaging the apron feeder units.

Now, FIGS. 5 to 9 are described with show possible visualizations by the display unit 495. These visualizations are not limiting, and further visualizations may be possible.

The display unit 495 may display various kind of information of the apron feeder, wherein the information may be divided in different levels. For example, as shown later in the figures, the first level L0 shows an overview of the apron feeder, the second level L1 shows individual component details, the third level L2 shows individual replacement or readjustment instructions, such as manual extracts, step-by-step instructions, videos or the like, and the fourth level L3 shows individual part numbers which may be SAP linked. The four levels are not limiting, and the information may be divided in fewer or more levels. The operator may switch between these levels by button selection, i.e. by pressing a button on the display unit, by touching a touch screen of the display unit, when the display unit has a touch screen, or the like.

Access level security may be used which may restrict the access to the levels for individual operators. For example, if there is a plurality of operators for the apron feeder, all operators may be allowed to access the L0 level, while some operators may be restricted to accessing any one of the levels L1, L2, and/or L3. Thus, access control can be provided which may be important for protecting sensitive data, preventing inadvertent modifications and changes, or the like.

Figure 5A:
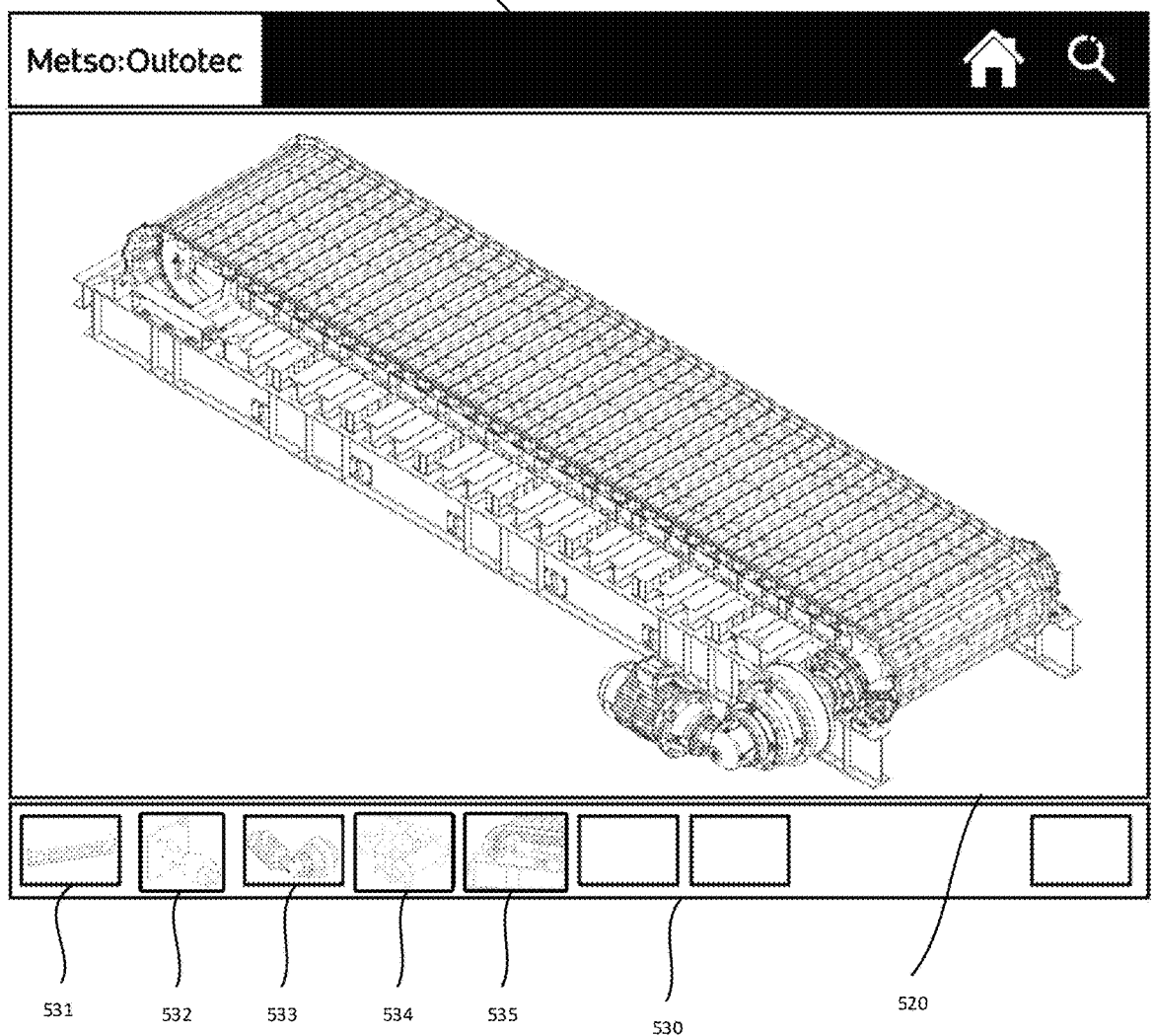
FIGS. 5A and B show an overview of the apron feeder and its monitored units as displayed by a display unit according to an embodiment of the invention.
Figure 5B:
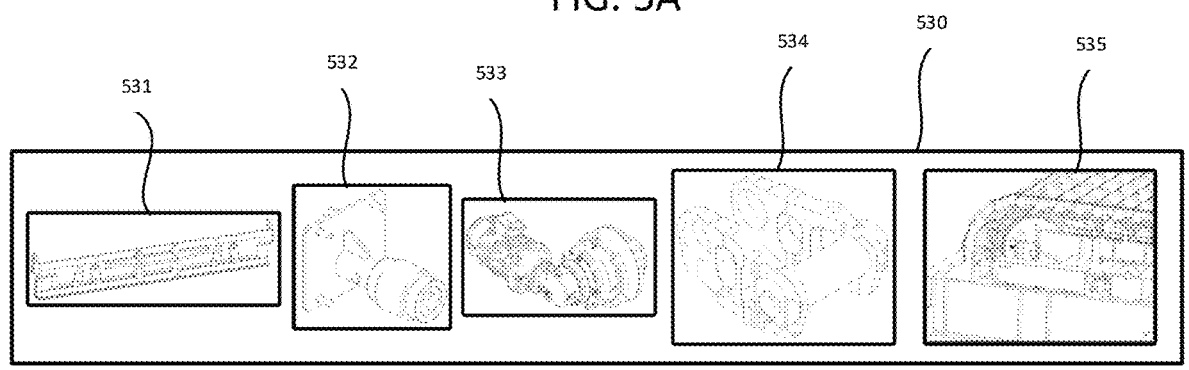

FIG. 5A shows an overview of the apron feeder as displayed by a display unit according to an embodiment of the invention.

In FIG. 5A, an exemplary display of the L0 level is given. The display may be divided into three sections 510, 520, and 530, wherein the top section 510 may provide symbols for navigating between the various displays, changing display settings, or the like. The middle section 520 may display the overall apron feeder having the apron feeder units of different types. The bottom section 530 may display the various sensor modules or apron feeder units.

For example, the bottom section 530 may display the pan module in box 531, the return roller module in box 532, the gearbox module in box 533, the chain module in box 534, and the tail wheel module in box 535. This display is not limiting, and the bottom section 530 may display fewer or more modules or units, also in a different order. In order to give a better view of the boxes 531, 532, 533, 534, and 535, the boxes are shown magnified in FIG. 5B.

The display unit 495 may distinguishably display or highlight the units of the apron feeder which need to be replaced or readjusted. For example, the display unit 495 highlights the units to be replaced or readjusted by using colour, visual effects, audio effects, like an alarm, or the like. For example, box 535 is shown in red or any other colour indicating that this apron feeder unit needs to be replaced or readjusted. In this example, box 535 refers to the tail wheel module. Thus, the operator immediately recognizes that the tail wheel needs to be readjusted. Box 535 may also start blinking or change its shape, or an alarm may be output by the display unit 495 in order to draw the operator's attention to it. The display unit 495 may update the display continuously to ensure real-time monitoring of the apron feeder.

According to another embodiment, the display unit 495 may show the condition of each apron feeder unit based on the result of the processing unit 480. The result of the processing unit 480 may indicate whether or not individual units of the apron feeder need to be replaced or readjusted based on their conditions. In order to show the condition of each apron feeder unit, the boxes 531 to 535 may be displayed in different colour, shapes, or the like to display whether or not the apron feeder units need to be replaced or readjusted. For example, a traffic light indication may be used, wherein the box is red when the corresponding unit needs to be replaced, the box is yellow when the condition of the corresponding unit deteriorates but the unit still does not need to be replaced or readjusted, and the box is green when the corresponding unit works correctly and does not need to be replaced or readjusted. For example, box 535 is red to show that the tail wheel needs to be readjusted as quickly as possible, box 534 is yellow to show that the chain tension starts to deteriorate but readjustment can still wait, and boxes 531, 532, and 533 are green to show that no actions by the operator are required with regard to the pans, the return rollers, and the gearbox oil. Of course, any other colour system may be used. For example, box 533 is displayed in blue instead of green.

According to another example, the display unit 495 may indicate to the operator when the processing unit 480 does not receive any sensor data from a sensor module. For example, boxes 531 and 532 are displayed in grey to indicate that either the pan module and the return roller module are not built into the apron feeder and are thus not used, or the pan module and the return roller module are built into the apron feeder but issues within the sensor data transmission occur. For example, it can be possible that the sensors within the pan module and the return roller module stopped working and need to be replaced or repaired to ensure proper sensor data transmission from the sensor modules to the base station. It is also possible that the sensors work, but the transmitted sensor data do not arrive at the base station.

It is also possible that the transmission between the sensor modules and the base station works, but problems within the transmission between the base station and the processing unit occur. With this information, the operator is alerted to check the sensors and/or the transmission paths between the units of the apron feeder intelligent monitoring system. Thus, it is ensured that any problems within the apron feeder intelligent monitoring system are quickly solved.

Figure 6A:
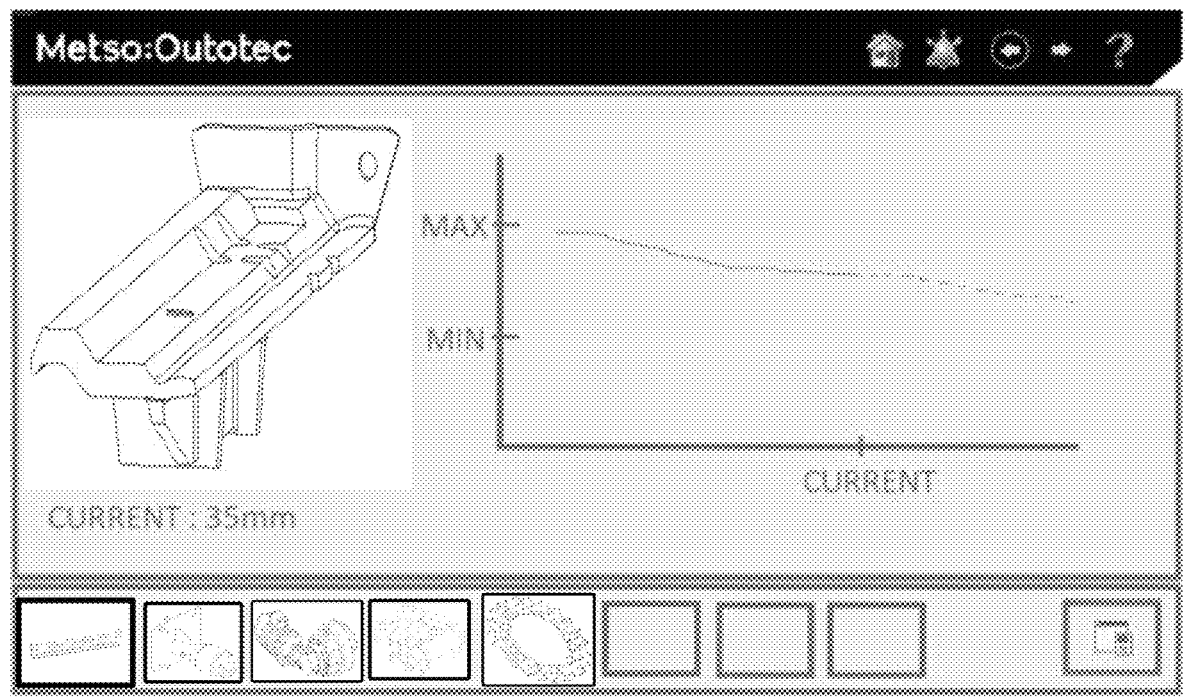
FIGS. 6A and 6B show the display of pan wear information by a display unit according to an embodiment of the invention.
Figure 6B:
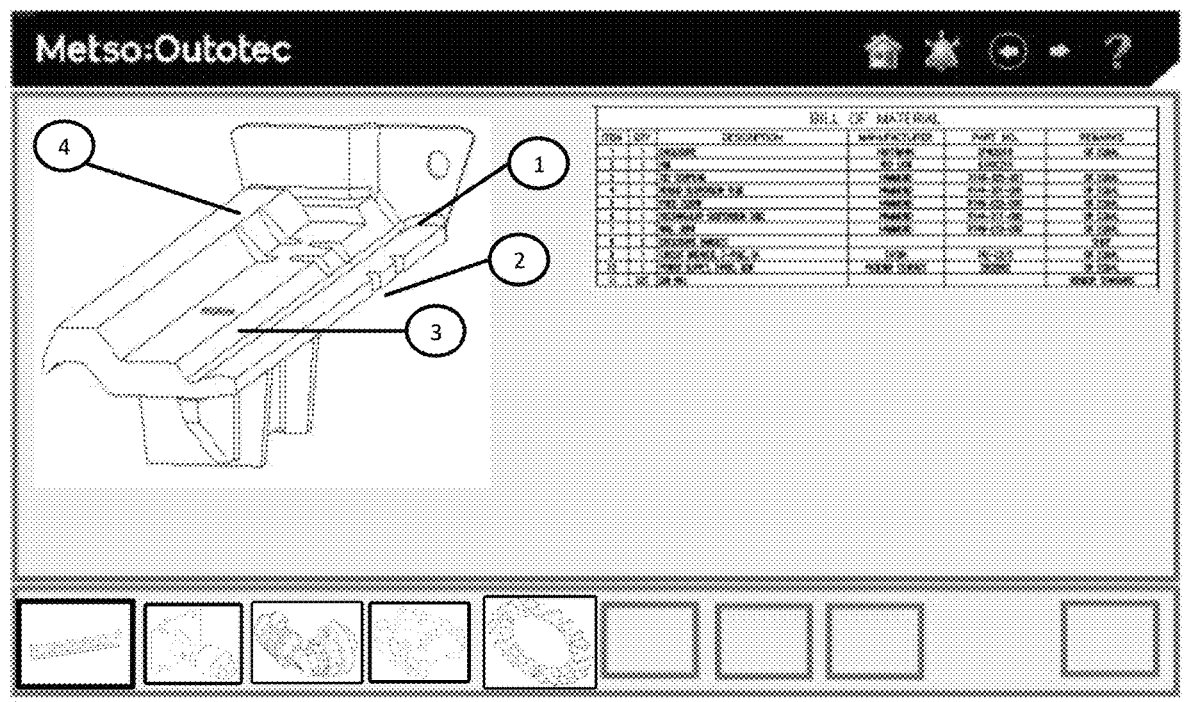

When the operator wishes to get further information about a specific apron feeder unit, the operator may access levels L1, L2, and/or L3. FIGS. 6A and 6B are visualisations and exemplary show the display of levels L1 and L3 with regard to pan wear information.

The top and bottom sections of the display may remain the same with regard to the L0 level display, but the middle section may change. In FIG. 6A, level L1 is displayed which shows the amount of wear that occurs to the apron feeder pans. Level L1 may indicate the maximum thickness of the pan which may reduce over time. In FIG. 6A, a time chart is used which indicates the maximum thickness of the pan with "MAX". As can be seen from the time chart, the thickness of the pan reduces over time and thus the amount of wear increases. As shown in FIG. 6A, the current pan thickness is 35 mm. Once the pan thickness falls below the minimum allowable thickness of the pan (indicated with "MIN"), the display unit 495 may indicate to the operator that the amount of wear is too high and the apron feeder pans need to be replaced. As further shown in FIG. 6A, a prediction as to an estimated thickness trend is also determined and indicated (dotted line). Such an estimation may be derived based on historical usage data of the apron feeder in a specific location, and may indicate a period of time in which the current pans can still be used safely.

Once the apron feeder pans need to be replaced, the operator may access level L2 (not shown) which displays information about how to correctly replace the pans.

FIG. 6B shows level L3 with regard to pan wear. Level L3 displays the individual part numbers of the apron feeder pan, a description with regard to the individual pan parts, names of the manufacturers, or the like. Thus, the operator knows which parts are needed to correctly replace the apron feeder pans. Furthermore, the operator can immediately order the parts that are needed from the manufacturers.

In FIGS. 6A and 6B, it is assumed that all pans are replaced at the same time. Sometimes, however, the units of the same type do not need to be replaced at once. For example, a single pan is damaged, or a single return roller does not rotate correctly. It would be a waste of time and material to replace all pans or all return rollers just because one unit is damaged. Thus, the result of the determination may comprise identification information which identifies the units of the apron feeder, the identification information being correlated with a piece of information whether or not the unit needs to be replaced or readjusted. Based on the identification information, the display unit 495 is able to show which specific unit among the units of the same type needs to be replaced or readjusted. Thus, the operator is able to quickly replace or readjust a single pan, return roller, or the like. The units of the same type are units which have the same function within the apron feeder.

Figure 7A:
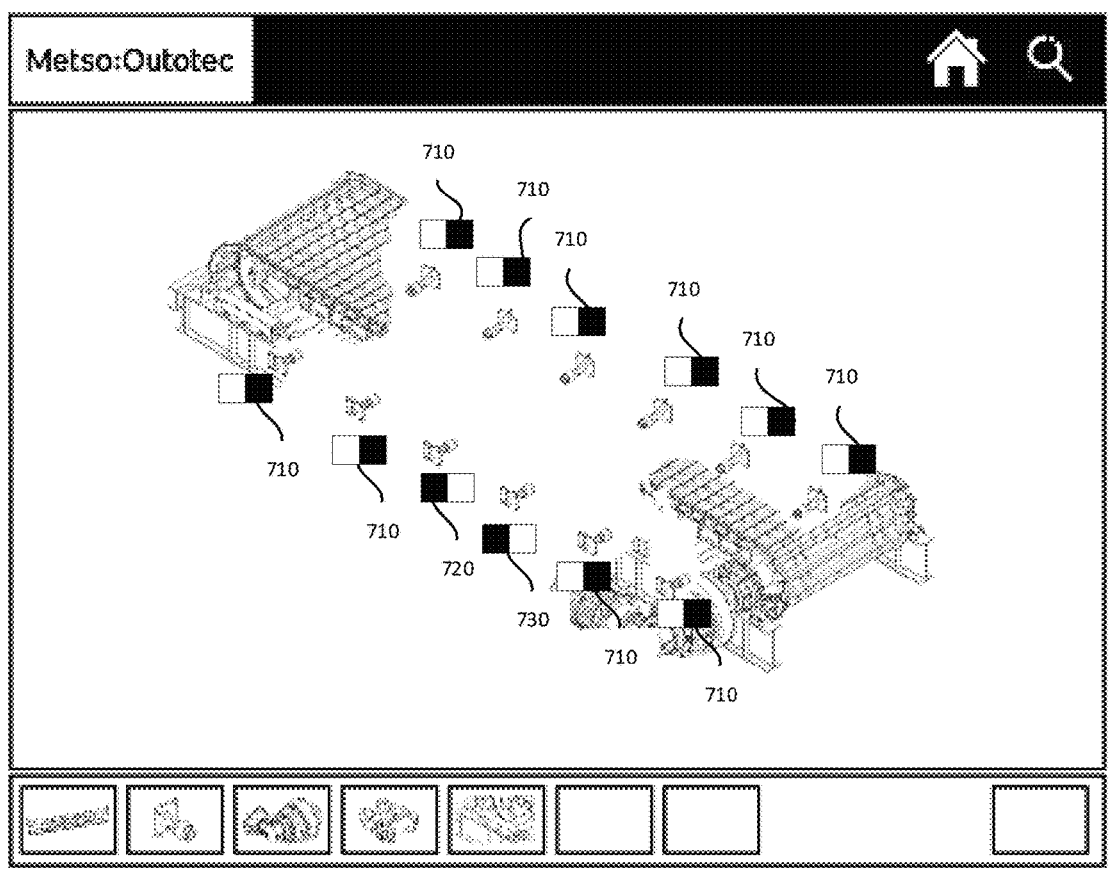
FIGS. 7A to 7C show the display of return roller information by a display unit according to an embodiment of the invention.
Figure 7B:
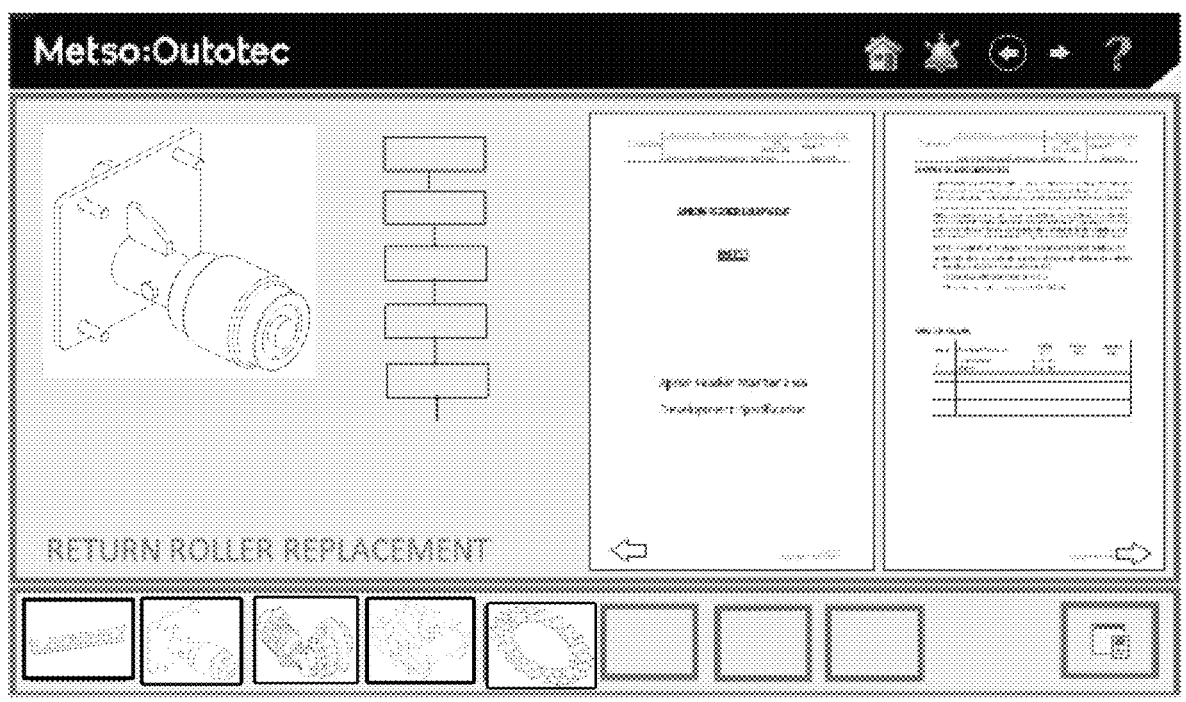
Figure 7C:
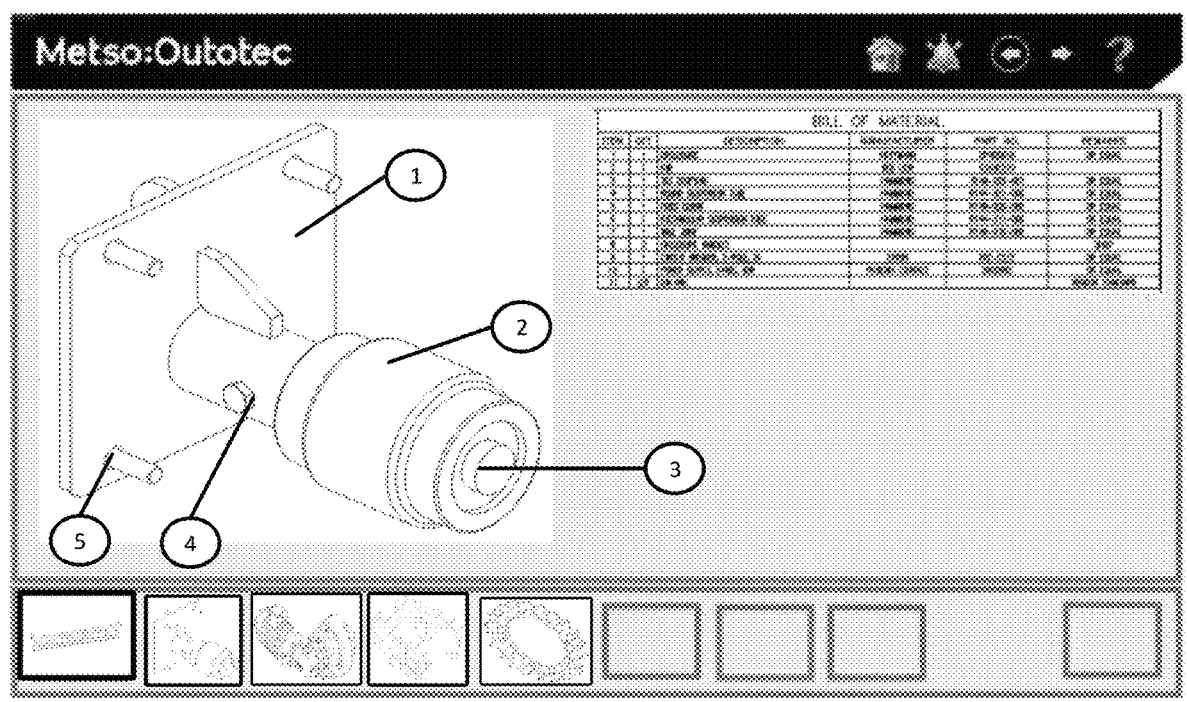

This is shown in FIGS. 7A to 7C for the return rollers. FIGS. 7A to 7C exemplary show the display of levels L1, L2, and L3 with regard to return roller information. The top and bottom sections of the display may remain the same with regard to the L0 level display, but the middle section may change.

FIG. 7A displays level L1 with regard to the return rollers. Next to each return roller, a symbol is displayed which shows the condition of each return roller. For example, the symbols 710 placed next the return rollers may indicate that the corresponding return rollers work properly and thus do not need to be replaced. Symbols 710 may be coloured, for example in green, to further highlight that these return rollers are ok.

Symbols 720 and 730 may, however, indicate that the corresponding return rollers have problems and thus need to be replaced. Symbols 720 and 730 may be coloured, for example in red, to further highlight that these return rollers are not ok. It is also possible that symbols 720 and 730 have different colours to further distinguish between the return rollers. For example, symbol 720 is yellow and symbol 730 is red to indicate that the return roller corresponding to symbol 730 needs to be replaced as fast as possible, while the return roller corresponding to symbol 720 can be replaced at a later time.

Thus, the operator is able to quickly grasp the conditions of each return roller and to plan repairment. Furthermore, the operator is able to accurately grasp the overall state of the apron feeder in real-time using just a single apron feeder intelligent monitoring system.

When the operator needs to replace a return roller, the operator may access level L2 which is shown in FIG. 7B. As shown in FIG. 7B, a step-by-step instruction and an excerpt from a manual is displayed to help the operator with correctly replacing the damaged return roller.

If the operator needs further information regarding the return roller parts in order to replace them, the operator may access level L3 shown in FIG. 7C. Thus, the operator receives a description with regard to the return roller part, names of manufacturers, parts number, and the like.

Figure 8A:
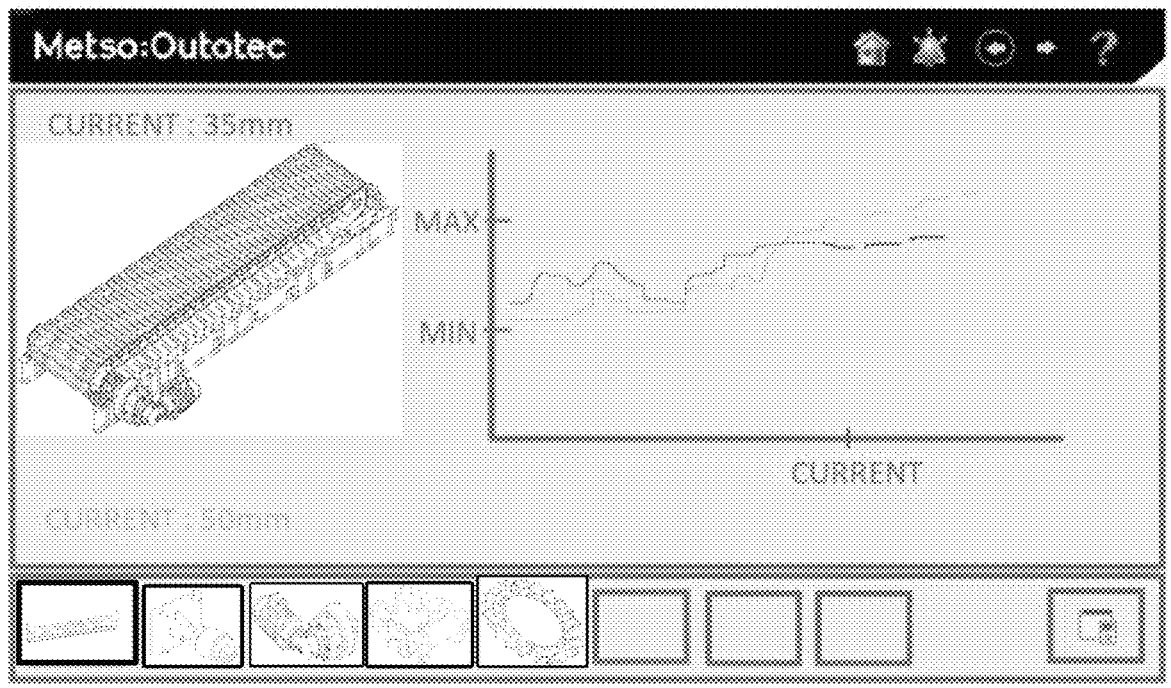
FIGS. 8A and 8B show the display of chain tension information by a display unit according to an embodiment of the invention.
Figure 8B:
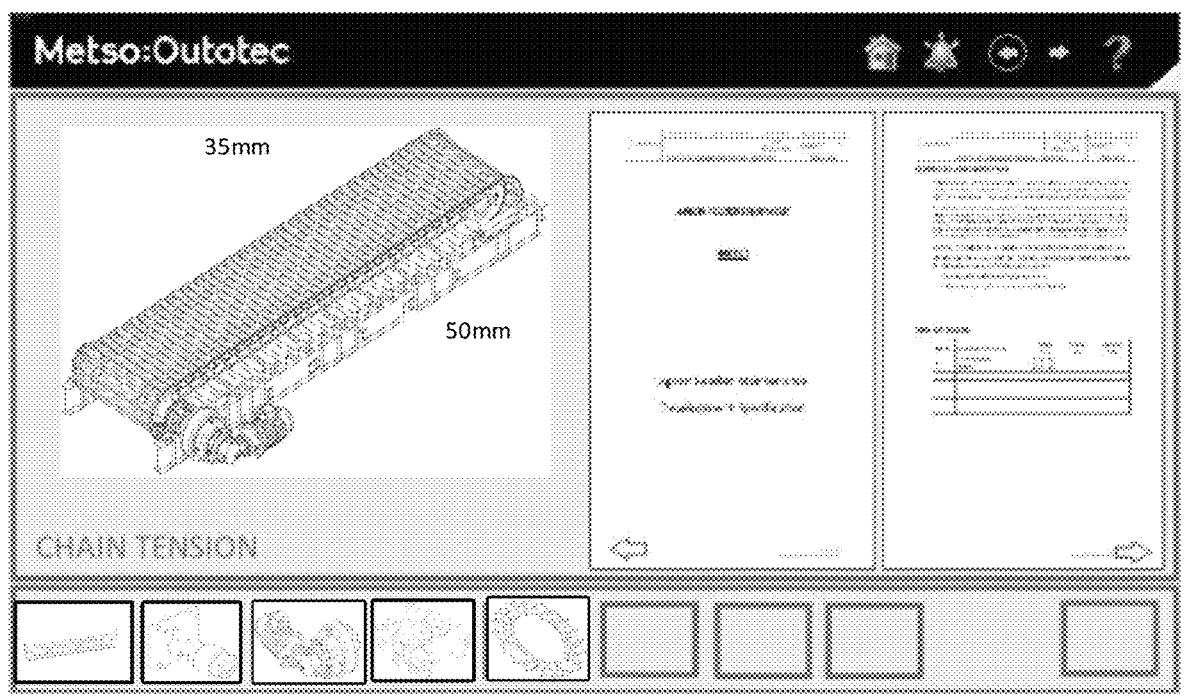

FIGS. 8A and 8B exemplary show the display of levels L1 and L2 with regard to chain tension information. The top and bottom sections of the display may remain the same with regard to the L0 level display, but the middle section may change.

FIG. 8A shows an example of level L1 with regard to the chain tension. A time chart is shown which indicates the chain tension over time. The time chart may be updated in real-time to allow real-time monitoring of the chain tension.

For example, the chain tension is in a valid range when it is within the measured distance range of 50 to 75 mm. Thus, the maximum allowable value "MAX" within the time chart may be set to 75 mm and the minimum allowable value "MIN" within the time chart may be set to 50 mm. However, any other value for the maximum allowable value and the minimum allowable value may be chosen. The current chain tension may be indicated with 30 mm or 50 mm. Once the chain tension exceeds the maximum value or falls below the minimum value, it may be displayed to the operator that the tail wheel needs to be realigned to correct the chain tension.

When the operator needs to know how to correct the chain tension, the operator may access level L2 shown in FIG. 8B. FIG. 8B shows an exemplary display of an excerpt from a manual which explains how to correct the chain tension.

Figure 9A:
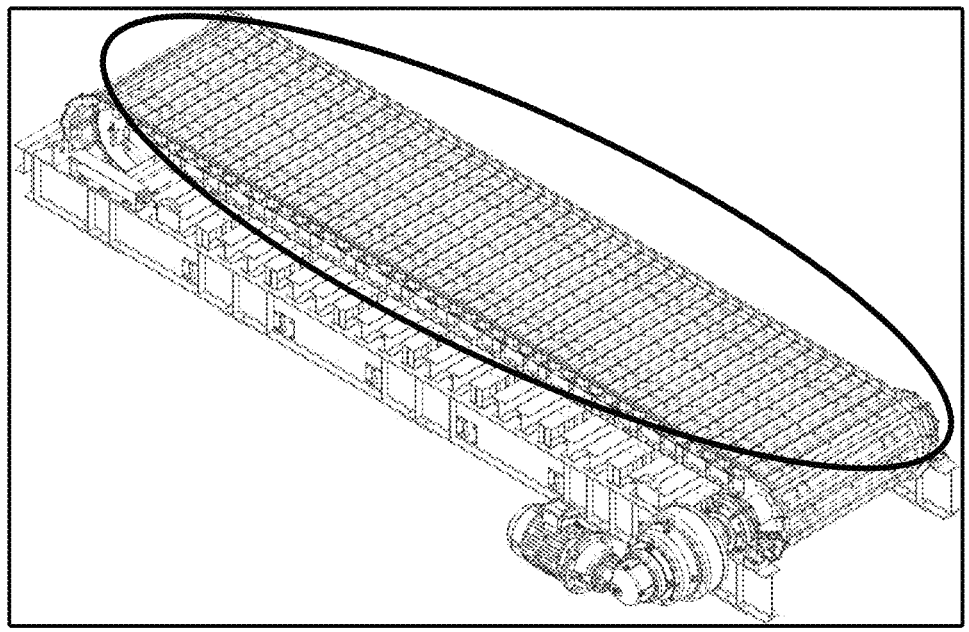
FIGS. 9A to 9E show a navigation display within an apron feeder by a display unit according to an embodiment of the invention.
Figure 9B:
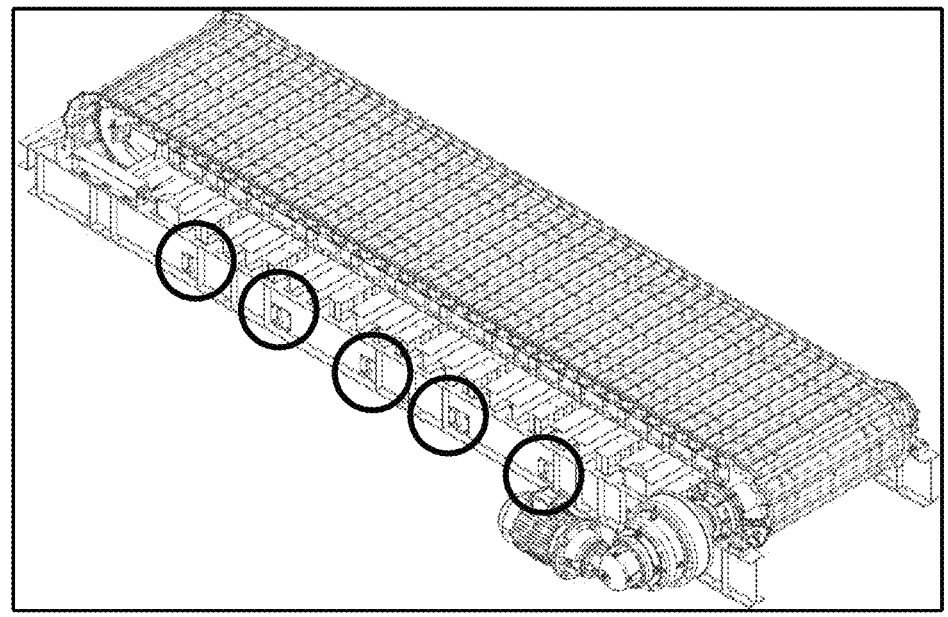
Figure 9C:
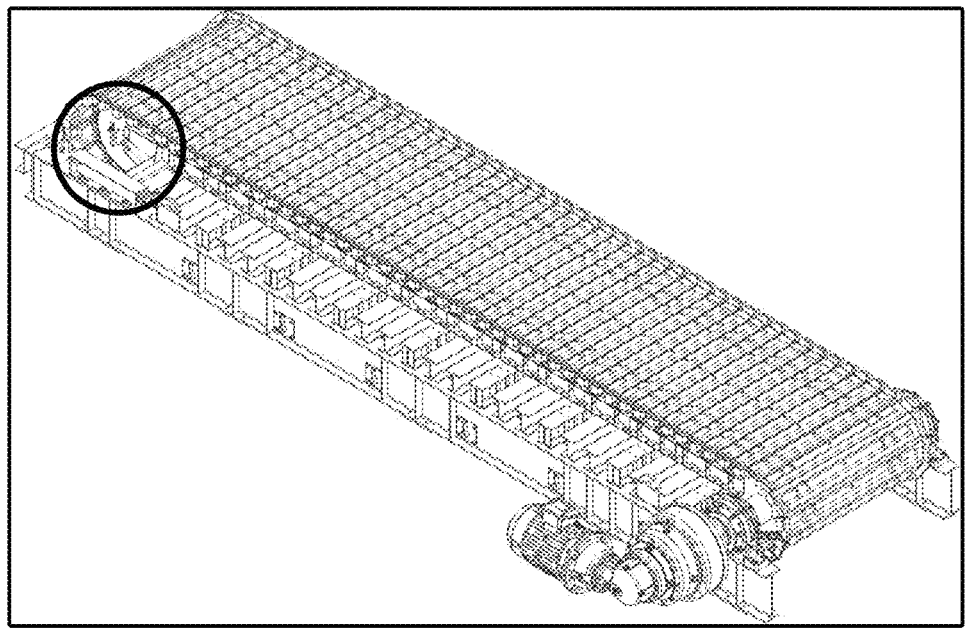
Figure 9D:
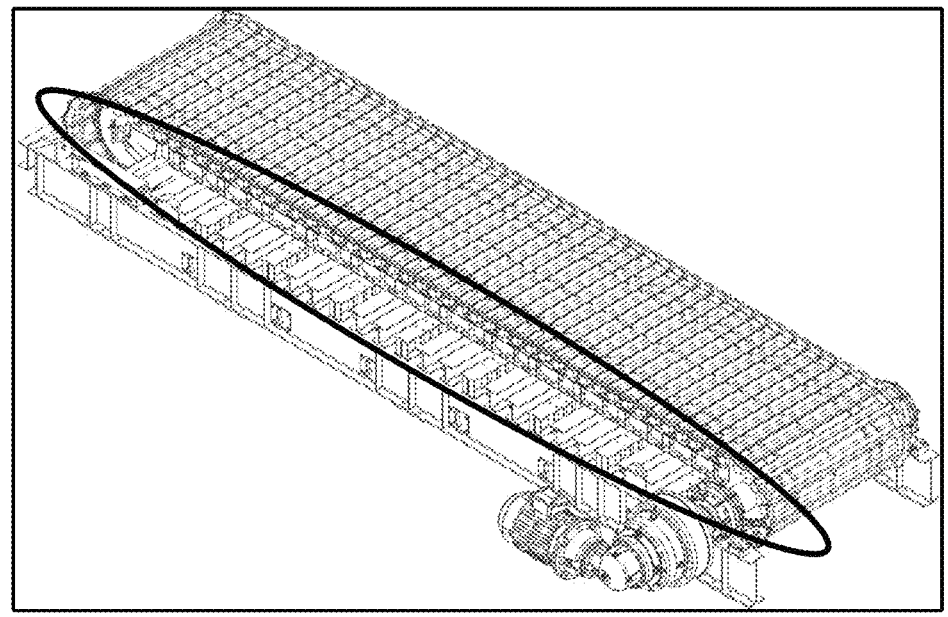
Figure 9E:
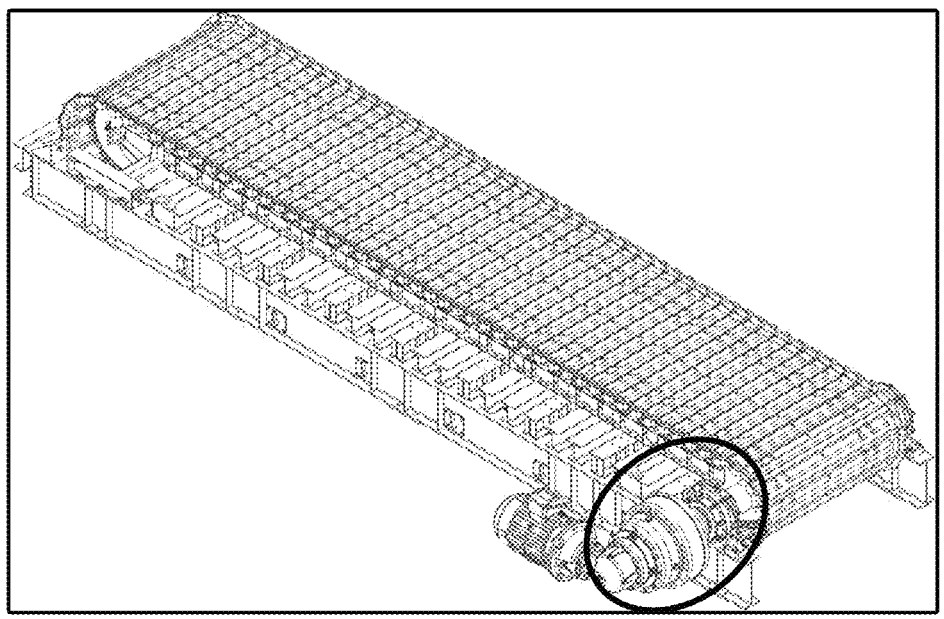

FIGS. 9A to 9E show a navigation display within an apron feeder by a display unit according to an embodiment. In FIG. 9A, the apron feeder pans are selected and highlighted. Here, the apron feeder pans are highlighted by encircling them. However, it is also possible that they are highlighted in different colours to distinguish them from the other apron feeder parts. In FIG. 9B, the return rollers of the apron feeder are selected and highlighted. Again, the return rollers are highlighted by encircling them. However, it is also possible that they are highlighted in different colours to distinguish them from the other apron feeder parts. In FIG. 9C, the tail wheel of the apron feeder for tail wheel realignment is selected and highlighted. Again, the tail wheel is highlighted by encircling it. However, it is also possible that the tail wheel is highlighted in different colours to distinguish it from the other apron feeder parts. In FIG. 9D, the endless chain for the chain tension is selected and highlighted. Here, the endless chain is highlighted by encircling it. However, it is also possible that the endless chain is highlighted in different colours to distinguish it from the other apron feeder parts. In FIG. 9E, the drive sprockets are selected and highlighted. Again, the drive sprockets are highlighted by encircling them. However, it is also possible that they are highlighted in different colours to distinguish them from the other apron feeder parts. The operator is able to navigate through the apron feeder and the specific units are highlighted, such that the operator learns where the different units of the apron feeder are located. Thus, the operator immediately knows where to find the apron feeder units when repairment or realignment must be performed.

Figure 10:
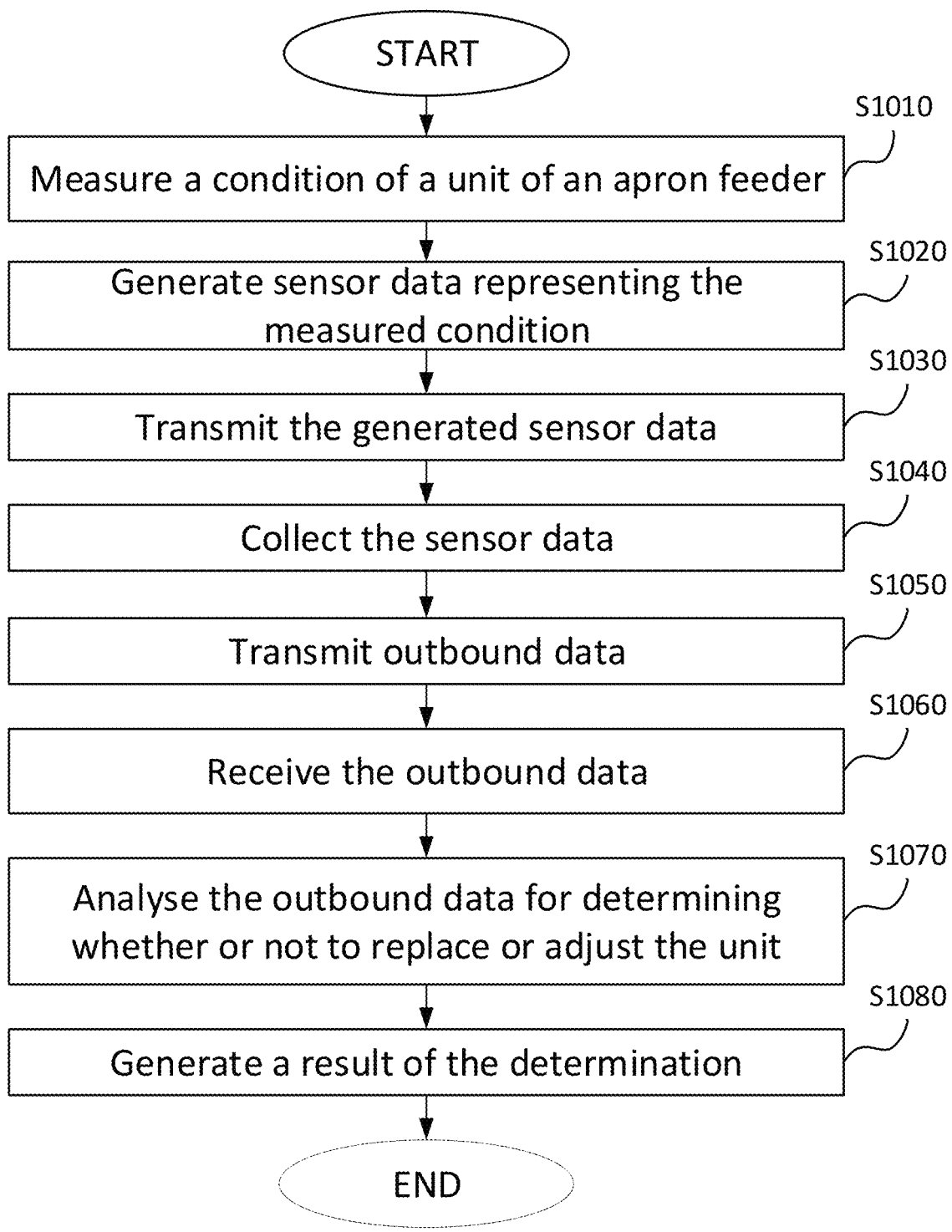
FIG. 10 shows a flowchart of an apron feeder intelligent monitoring method according to an embodiment of the invention.

FIG. 10 shows a flowchart of an apron feeder intelligent monitoring method according to an embodiment of the invention. The method can be performed by the system and modules as described in detail above.

In FIG. 10, a method for continuously monitoring an apron feeder having a plurality of units is described, wherein the apron feeder is in relation to a plurality of sensor modules of different types, each sensor module referring to a specific type of units of the apron feeder and comprising at least one sensor. The expression of the apron feeder being in relation to a plurality of sensor modules may mean that the apron feeder is associated or connected to the sensor modules. The expression of the apron feeder being in relation to a plurality of sensor modules may also mean that the sensor modules are integrated or built in the apron feeder.

As shown in FIG. 10, the method comprises the step S1010 of measuring, by each sensor, a condition of a unit of the apron feeder, and the step S1020 of generating, by the sensor, sensor data representing the measured condition. Furthermore, the method comprises the step S1030 of transmitting, by the sensor, the generated sensor, and the step of S1040 of collecting, by a base station, the sensor data from the plurality of sensor modules. In step S1050, the base station transmits outbound data, wherein the outbound data is based on the collected sensor data.

In step S1060, a processing unit receives the outbound data from the base station and analyses (step S1070) the outbound data for determining whether or not the unit of the apron feeder needs to be replaced or readjusted based on its condition. Furthermore, the processing unit generates a result of the determination for continuously indicating a state of the apron feeder. The unit may need to be replaced or readjusted when its condition does not meet a predetermined threshold.

It will be apparent to those skilled in the art that various modifications and variations can be made in the entities and methods of this invention as well as in the construction of this invention without departing from the scope or spirit of the invention.

The invention has been described in relation to particular embodiments and examples which are intended in all aspects to be illustrative rather than restrictive. Those skilled in the art will appreciate that many different combinations of hardware, software and/or firmware will be suitable for practicing the present invention.

Moreover, other implementations of the invention will be apparent to those skilled in the art from consideration of the specification and practice of the invention disclosed herein. It is intended that the specification and the examples be considered as exemplary only. To this end, it is to be understood that inventive aspects lie in less than all features of a single foregoing disclosed implementation or configuration. Thus, the true scope and spirit of the invention is indicated by the following claims.

The present disclosure further includes the following embodiments E1-E17:

E1. A system for continuously monitoring an apron feeder having a plurality of units, comprising:
a plurality of sensor modules of different types, wherein each sensor module refers to a specific type of unit of the apron feeder and comprises at least one sensor, each sensor being configured to measure an individual condition of a unit of the apron feeder, to generate sensor data representing the measured individual condition, and to transmit the generated sensor data;
a base station configured to collect the sensor data from the plurality of sensor modules, and to transmit outbound data, the outbound data being based on the collected sensor data; and
a processing unit configured to receive the outbound data from the base station, to analyse the outbound data for determining whether or not any of the unit of the apron feeder needs to be replaced or readjusted based on its individual condition, and to generate a result of the determination for continuously indicating an overall state of the apron feeder,
wherein the unit needs to be replaced or readjusted when its individual condition does not meet a predetermined threshold.

E2. The system according to embodiment E1, wherein the sensor is configured to wirelessly transmit the generated sensor data to the base station.

E3. The system according to embodiments E1 or E2, wherein
the plurality of sensor modules comprises at least one of a pan module, a return roller module, a tail wheel module, a gearbox module, and a chain module;
the pan module refers to at least one pan of the apron feeder;
the return roller module refers to at least one return roller of the apron feeder;
the tail wheel module refers to a tail wheel assembly of the apron feeder;
the gearbox module refers to a gearbox of the apron feeder; and
the chain module refers to an endless chain of the apron feeder.

E4. The system according to embodiment E3, wherein
the pan module comprises at least one pan wear sensor, the return roller module comprises at least one return roller rotation sensor, the tail wheel module comprises at least one tail wheel alignment sensor, the gearbox module comprises at least one gearbox oil monitoring sensor, and the chain module comprises at least one chain sag sensor;
the pan wear sensor is configured to measure the individual condition of a pan of the apron feeder;
the return roller rotation sensor is configured to measure the individual condition of a return roller of the apron feeder;
the tail wheel alignment sensor is configured to measure the individual condition of the tail wheel of the apron feeder;
the gearbox oil monitoring sensor is configured to measure the individual condition of oil within the gearbox of the apron feeder; and
the chain sag sensor is configured to measure the individual condition of the endless chain of the apron feeder.

E5. The system according to embodiment E4, wherein
i. the pan wear sensor is configured to measure an amount of wear of the pan due to objects being transported by the apron feeder; and
ii. the processing unit is configured to determine that the pan of the apron feeder needs to be replaced when the amount of wear exceeds a predetermined pan threshold.

E6. The system according to embodiments E4 or E5, wherein
i. the return roller rotation sensor is configured to detect movement of the return roller by measuring the rotational speed of the return roller; and
the processing unit is configured to determine that the return roller of the apron feeder needs to be replaced when the rotational speed is smaller than a predetermined return roller threshold.

E7. The system according to any one of embodiments E4 to E6, wherein
the tail wheel alignment sensor is configured to measure an alignment offset of the tail wheel; and
the processing unit is configured to determine that the tail wheel needs to be readjusted when the alignment offset exceeds a predetermined tail wheel threshold.

E8. The system according to any one of embodiments E4 to E7, wherein
the gearbox oil monitoring sensor is configured to measure a parameter of the oil within the gearbox, the parameter representing characteristics of the oil; and
the processing unit is configured to determine that the oil within the gearbox needs to be replaced when the parameter exceeds a predetermined oil threshold.

E9. The system according to any one of embodiments E4 to E8, wherein
the chain sag sensor is configured to measure a sag parameter of the endless chain, the sag parameter representing the chain sag of the endless chain; and
the processing unit is configured to determine that the tail wheel needs to be readjusted when the sag parameter exceeds a predetermined chain sag threshold.

E10. The system according to any one of embodiments E1 to E9, further comprising
i. a display unit configured to display the result of the processing unit.

E11. The system according to embodiment E10, wherein
i. if a unit of the plurality of units of the apron feeder needs to be replaced or readjusted, the processing unit is configured to indicate an instruction for instructing how to replace or readjust the unit of the apron feeder; and the display unit is configured to display the generated instruction.

E12. The system according to embodiment E11, wherein the processing unit is configured to generate the instruction and/or refer to a storing unit where the instruction is to be found.

E13. The system according to any one of embodiments E1 to E12, wherein the result of the determination comprises identification information which identifies the units of the apron feeder, the identification information being correlated with a piece of information whether or not the unit needs to be replaced or readjusted.

E14. The system according to embodiments E10 and E13, wherein the display unit is configured to distinguishable display the units of the apron feeder which need to be replaced or readjusted.

E15. The system according to any one of embodiments E1 to E14, wherein the base station is configured to perform a pairing process with the plurality of sensor modules.

E16. A method for continuously monitoring an apron feeder having a plurality of units, the apron feeder being in relation to a plurality of sensor modules of different types, wherein each sensor module refers to a specific type of units of the apron feeder and comprises at least one sensor, the method comprising the steps of:

measuring, by each sensor, an individual condition of a unit of the apron feeder;

generating, by the sensor, sensor data representing the measured individual condition;

transmitting, by the sensor, the generated sensor;

collecting, by a base station, the sensor data from the plurality of sensor modules;

transmitting, by the base station, outbound data, the outbound data being based on the collected sensor data;

receiving, by a processing unit, the outbound data from the base station;

analysing, by the processing unit, the outbound data for determining whether or not any of the unit of the apron feeder needs to be replaced or readjusted based on its individual condition; and generating, by the processing unit, a result of the determination for continuously indicating an overall state of the apron feeder;

wherein the unit needs to be replaced or readjusted when its individual condition does not meet a predetermined threshold.

E17. An apron feeder comprising a system according to any one of embodiments E1 to E15, the system continuously monitoring the apron feeder having a plurality of units.

The invention claimed is:

1. A system for continuously monitoring an apron feeder having a plurality of units of different types, the apron feeder being operable to transfer bulk materials, comprising:

a plurality of sensor modules of different types, wherein each sensor module refers to a specific type of unit of the apron feeder and comprises at least one sensor, each sensor being configured to measure an individual condition of a unit of the apron feeder, to generate sensor data representing the measured individual condition, and to transmit the generated sensor data, wherein each unit of the plurality of units of different types has a different function within the apron feeder compared to the other units;

a base station configured to collect the sensor data from the plurality of sensor modules, and to transmit outbound data, the outbound data being based on the collected sensor data; and a processing unit configured to receive the outbound data from the base station, to analyse the outbound data for determining whether or not any of the unit of the apron feeder needs to be replaced or readjusted based on its individual condition, and to generate a result of the determination for continuously indicating an overall state of the apron feeder, wherein the unit needs to be replaced or readjusted when its individual condition does not meet a predetermined threshold.

2. The system according to claim 1, wherein each sensor is configured to wirelessly transmit the generated sensor data to the base station.

3. The system according to claim 1, wherein the plurality of sensor modules comprises at least one of a pan module, a return roller module, a tail wheel module, a gearbox module, and a chain module;

the pan module refers to at least one pan of the apron feeder;

the return roller module refers to at least one return roller of the apron feeder;

the tail wheel module refers to a tail wheel assembly of the apron feeder;

the gearbox module refers to a gearbox of the apron feeder; and the chain module refers to an endless chain of the apron feeder.

4. The system according to claim 3, wherein the pan module comprises at least one pan wear sensor, the return roller module comprises at least one return roller rotation sensor, the tail wheel module comprises at least one tail wheel alignment sensor, the gearbox module comprises at least one gearbox oil monitoring sensor, and the chain module comprises at least one chain sag sensor;

the pan wear sensor is configured to measure the individual condition of a pan of the apron feeder;

the return roller rotation sensor is configured to measure the individual condition of a return roller of the apron feeder;

the tail wheel alignment sensor is configured to measure the individual condition of the tail wheel of the apron feeder;

the gearbox oil monitoring sensor is configured to measure the individual condition of oil within the gearbox of the apron feeder; and the chain sag sensor is configured to measure the individual condition of the endless chain of the apron feeder.

5. The system according to claim 4, wherein the pan wear sensor is configured to measure an amount of wear of the pan due to objects being transported by the apron feeder; and the processing unit is configured to determine that the pan of the apron feeder needs to be replaced when the amount of wear exceeds a predetermined pan threshold.

6. The system according to claim 4, wherein the return roller rotation sensor is configured to detect movement of the return roller by measuring the rotational speed of the return roller; and the processing unit is configured to determine that the return roller of the apron feeder needs to be replaced when the rotational speed is smaller than a predetermined return roller threshold.

7. The system according to claim 4, wherein the tail wheel alignment sensor is configured to measure an alignment offset of the tail wheel; and the processing unit is configured to determine that the tail wheel needs to be readjusted when the alignment offset exceeds a predetermined tail wheel threshold.

8. The system according to claim 4, wherein the gearbox oil monitoring sensor is configured to measure a parameter of the oil within the gearbox, the parameter representing characteristics of the oil; and the processing unit is configured to determine that the oil within the gearbox needs to be replaced when the parameter exceeds a predetermined oil threshold.

9. The system according to claim 4, wherein the chain sag sensor is configured to measure a sag parameter of the endless chain, the sag parameter representing the chain sag of the endless chain; and the processing unit is configured to determine that the tail wheel needs to be readjusted when the sag parameter exceeds a predetermined chain sag threshold.

10. The system according to claim 1, further comprising a display unit configured to display the result of the processing unit.

11. The system according to claim 10, wherein if a unit of the plurality of units of the apron feeder needs to be replaced or readjusted, the processing unit is configured to indicate an instruction for instructing how to replace or readjust the unit of the apron feeder;

and the display unit is configured to display the generated instruction.

12. The system according to claim 11, wherein the processing unit is configured to generate the instruction and/or refer to a storing unit where the instruction is to be found.

13. The system according to claim 10, wherein the display unit is configured to distinguishable display the units of the apron feeder which need to be replaced or readjusted.

14. The system according to claim 1, wherein the result of the determination comprises identification information which identifies the units of the apron feeder, the identification information being correlated with a piece of information whether or not the unit needs to be replaced or readjusted.

15. The system according to claim 1, wherein the base station is configured to perform a pairing process with the plurality of sensor modules.

16. An apron feeder comprising a system according to claim 1, the apron feeder being operable to transfer bulk materials and the system being operable to continuously monitor the apron feeder having a plurality of units of different types.

17. A method for continuously monitoring an apron feeder having a plurality of units of different types, the apron feeder being used to transfer bulk materials and being in relation to a plurality of sensor modules of different types, wherein each sensor module refers to a specific type of units of the apron feeder and comprises at least one sensor and wherein each unit of the plurality of units of different types has a different function within the apron feeder compared to the other units, the method comprising the steps of:

measuring, by each sensor, an individual condition of a unit of the apron feeder;

generating, by the sensor, sensor data representing the measured individual condition;

transmitting, by the sensor, the generated sensor;

collecting, by a base station, the sensor data from the plurality of sensor modules;

transmitting, by the base station, outbound data, the outbound data being based on the collected sensor data;

receiving, by a processing unit, the outbound data from the base station;

analysing, by the processing unit, the outbound data for determining whether or not any of the unit of the apron feeder needs to be replaced or readjusted based on its individual condition; and generating, by the processing unit, a result of the determination for continuously indicating an overall state of the apron feeder;

wherein the unit needs to be replaced or readjusted when its individual condition does not meet a predetermined threshold.

* * * * *